(12) United States Patent
Bowman

(10) Patent No.: US 11,519,534 B2
(45) Date of Patent: *Dec. 6, 2022

(54) SPLIT RING COUPLING AND FITTING

(71) Applicant: Victaulic Company, Easton, PA (US)

(72) Inventor: Matthew A. Bowman, Palmer, PA (US)

(73) Assignee: Victaulic Company, Easton, PA (US)

( * ) Notice: Subject to any disclaimer, the term of this patent is extended or adjusted under 35 U.S.C. 154(b) by 82 days.

This patent is subject to a terminal disclaimer.

(21) Appl. No.: 17/183,470

(22) Filed: Feb. 24, 2021

(65) Prior Publication Data
US 2021/0180732 A1    Jun. 17, 2021

Related U.S. Application Data

(63) Continuation of application No. 16/509,951, filed on Jul. 12, 2019, now abandoned, which is a continuation of application No. 15/267,735, filed on Sep. 16, 2016, now Pat. No. 10,371,295, which is a continuation-in-part of application No. 14/574,984, filed on Dec. 18, 2014, now Pat. No. 10,100,957.

(60) Provisional application No. 61/920,138, filed on Dec. 23, 2013.

(51) Int. Cl.
| | | |
|---|---|---|
| *F16L 21/06* | (2006.01) | |
| *F16L 37/091* | (2006.01) | |
| *F16L 17/04* | (2006.01) | |
| *F16L 37/088* | (2006.01) | |
| *F16L 43/00* | (2006.01) | |

(52) U.S. Cl.
CPC ............ *F16L 21/065* (2013.01); *F16L 17/04* (2013.01); *F16L 37/088* (2013.01); *F16L 37/091* (2013.01); *F16L 43/00* (2013.01)

(58) Field of Classification Search
CPC ......... F16L 17/04; F16L 21/065; F16L 21/08; F16L 37/088; F16L 37/091; F16L 43/00
USPC .......................... 285/364, 367, 373, 406, 419
See application file for complete search history.

(56) References Cited

U.S. PATENT DOCUMENTS

| | | |
|---|---|---|
| 2,225,208 A | 4/1939 | Crickmer |
| 2,369,770 A | 2/1945 | Baxter |
| 2,449,795 A | 9/1948 | Stillwagon |
| 3,116,078 A | 12/1963 | Scherer |
| 6,065,784 A | 5/2000 | Lundstrom |
| 6,170,884 B1 | 1/2001 | McLennan |
| 7,909,369 B2 | 3/2011 | Kertesz |
| 8,177,263 B2 | 5/2012 | Dole et al. |

(Continued)

FOREIGN PATENT DOCUMENTS

| | | |
|---|---|---|
| CN | 101317032 A | 12/2008 |
| CN | 102597591 A | 7/2012 |

(Continued)

*Primary Examiner* — Zachary T Dragicevich
(74) *Attorney, Agent, or Firm* — Ballard Spahr LLP

(57) ABSTRACT

A pipe fitting has housing portions attached in spaced relation to define non-coaxial receptacles that receive pipe elements. The housing portions are supported on split rings received within grooves in each housing portion. The housing portions are supported in spaced relation in a preassembled state to permit insertion of pipe elements into the receptacles without disassembly of the fitting. The grooves in the housing portions have a floor surface with three surface portions. Two of the surface portions on each groove of each housing portion engage the split rings when the housing portions are supported in spaced relation.

8 Claims, 19 Drawing Sheets

(56) References Cited

U.S. PATENT DOCUMENTS

| | | |
|---|---|---|
| 8,517,430 B2 | 8/2013 | Dole et al. |
| 9,285,060 B2 | 3/2016 | Griggs, III et al. |
| 2008/0048444 A1 | 2/2008 | Porter et al. |
| 2008/0284161 A1 | 11/2008 | Dole et al. |
| 2013/0127160 A1 | 5/2013 | Bancroft et al. |
| 2013/0200610 A1 | 8/2013 | Cygler, III et al. |

FOREIGN PATENT DOCUMENTS

| | | |
|---|---|---|
| CN | 103270359 A | 8/2013 |
| DE | 1216627 | 5/1966 |
| DE | 3443942 | 6/1985 |
| DE | 3443943 | 6/1985 |
| DE | 10006029 | 8/2001 |
| JP | 60061582 | 4/1985 |
| JP | 08152084 | 11/1996 |
| JP | 2006207813 | 8/2006 |
| JP | 200832212 | 2/2008 |
| JP | 2010527430 | 8/2010 |

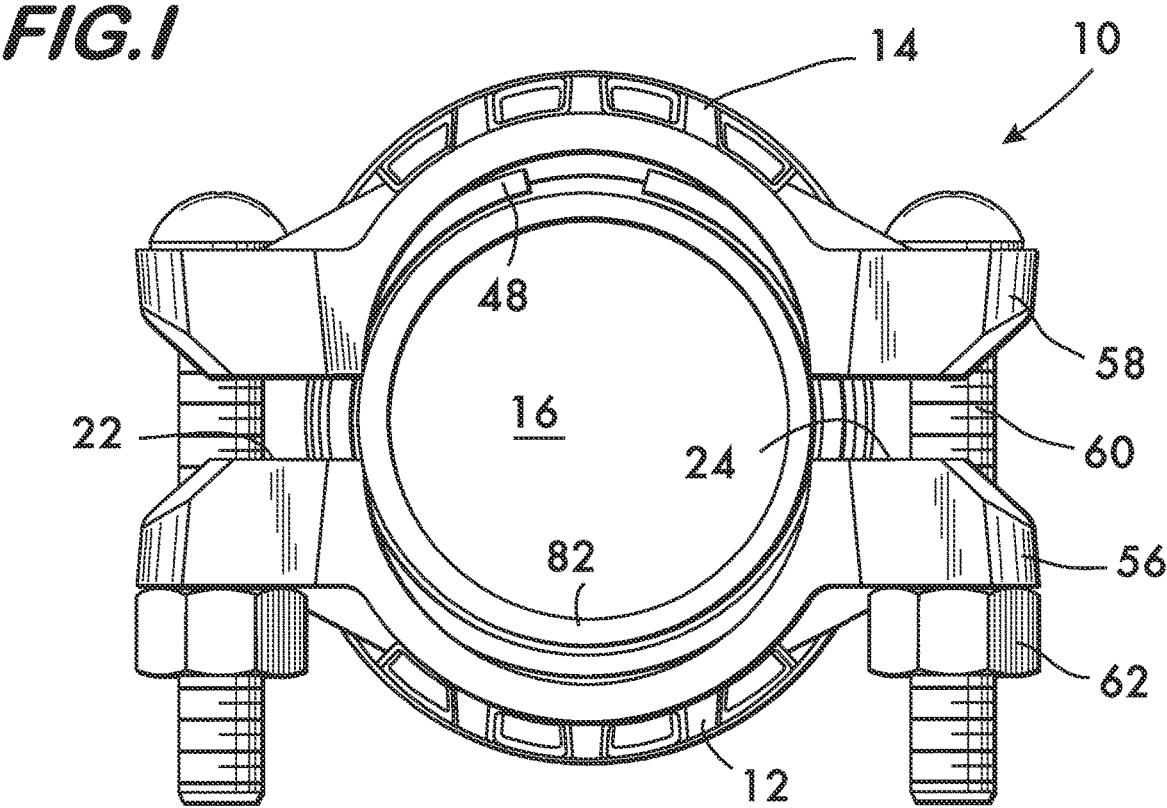
FIG.I
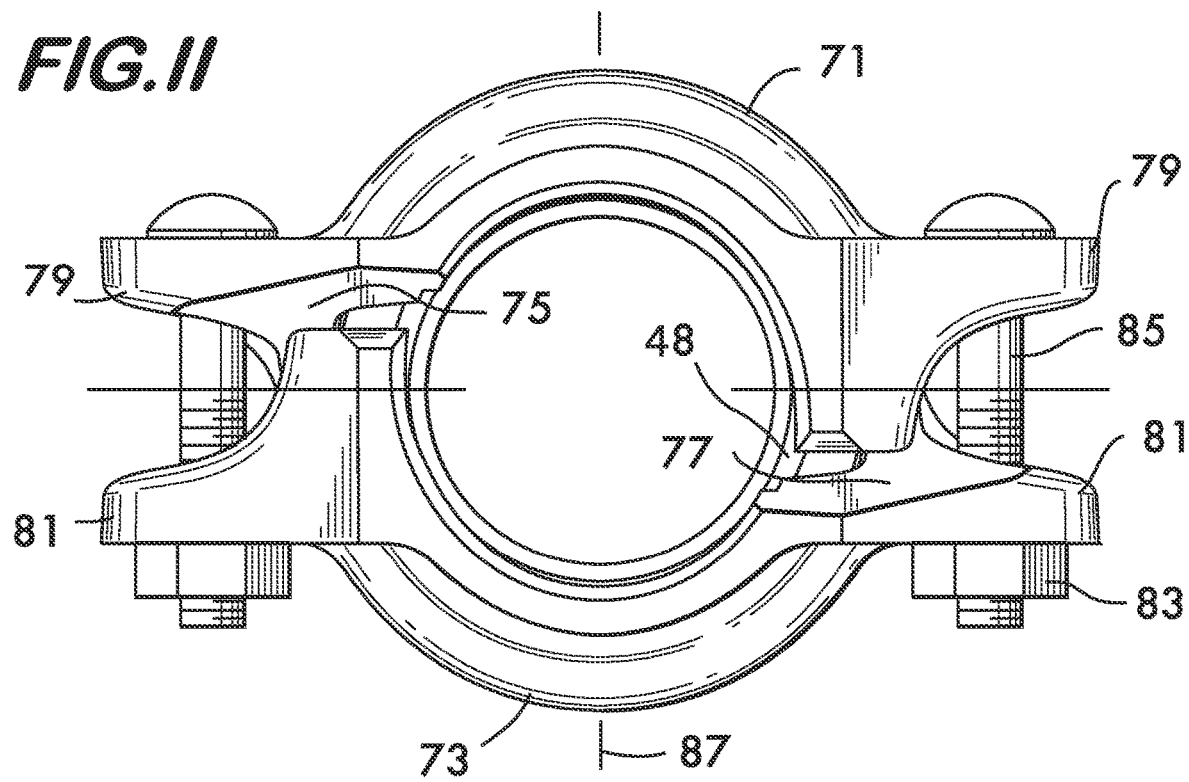
FIG.II

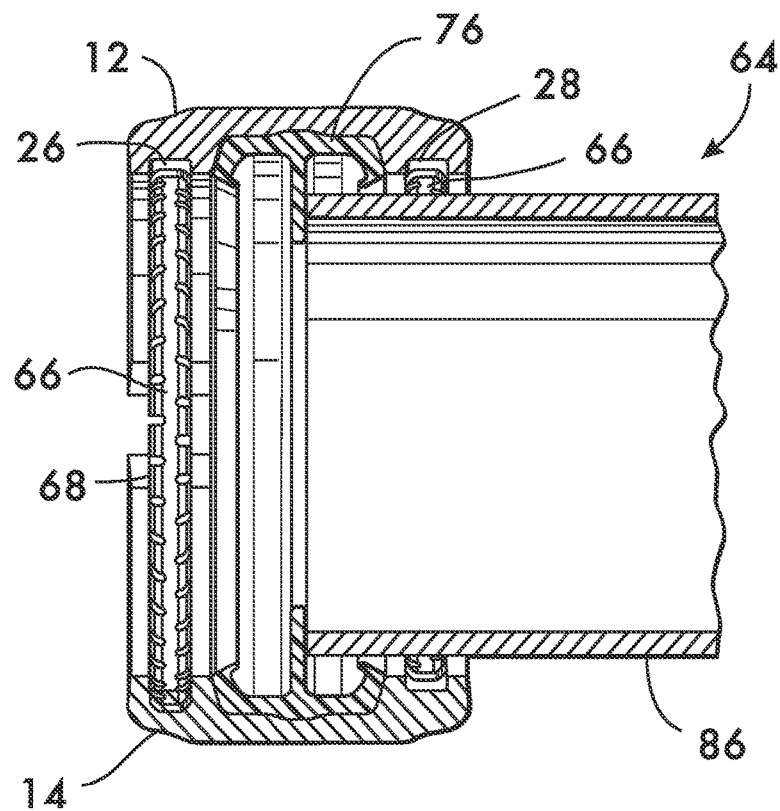
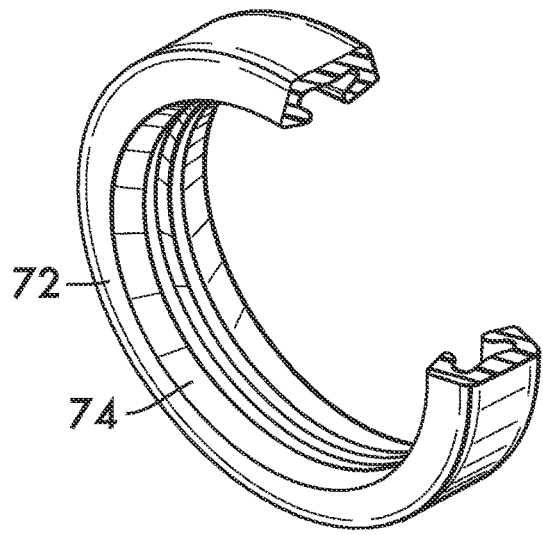
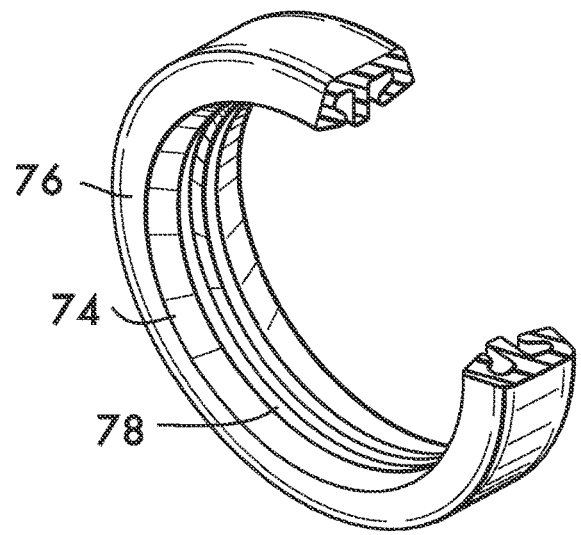

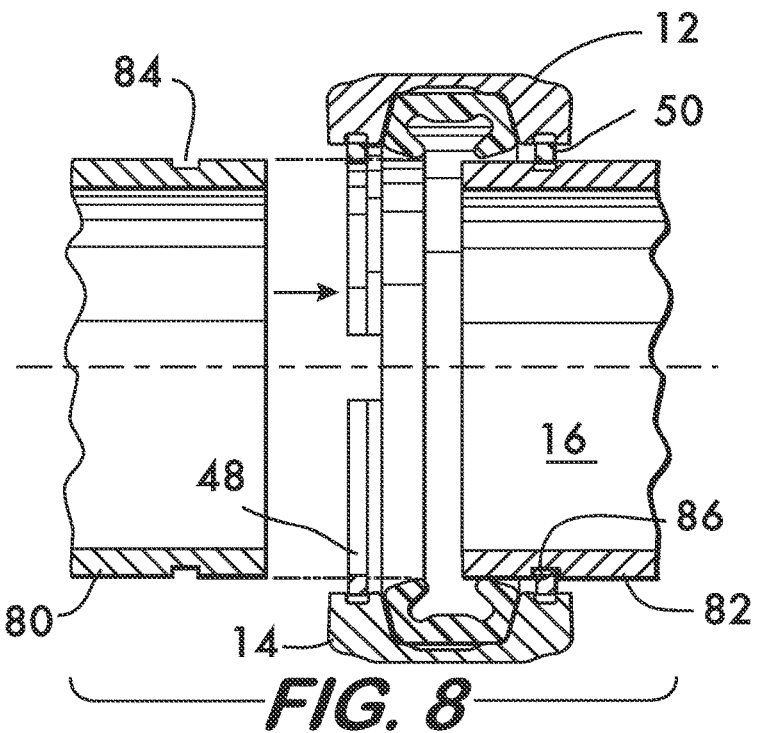
FIG. 8
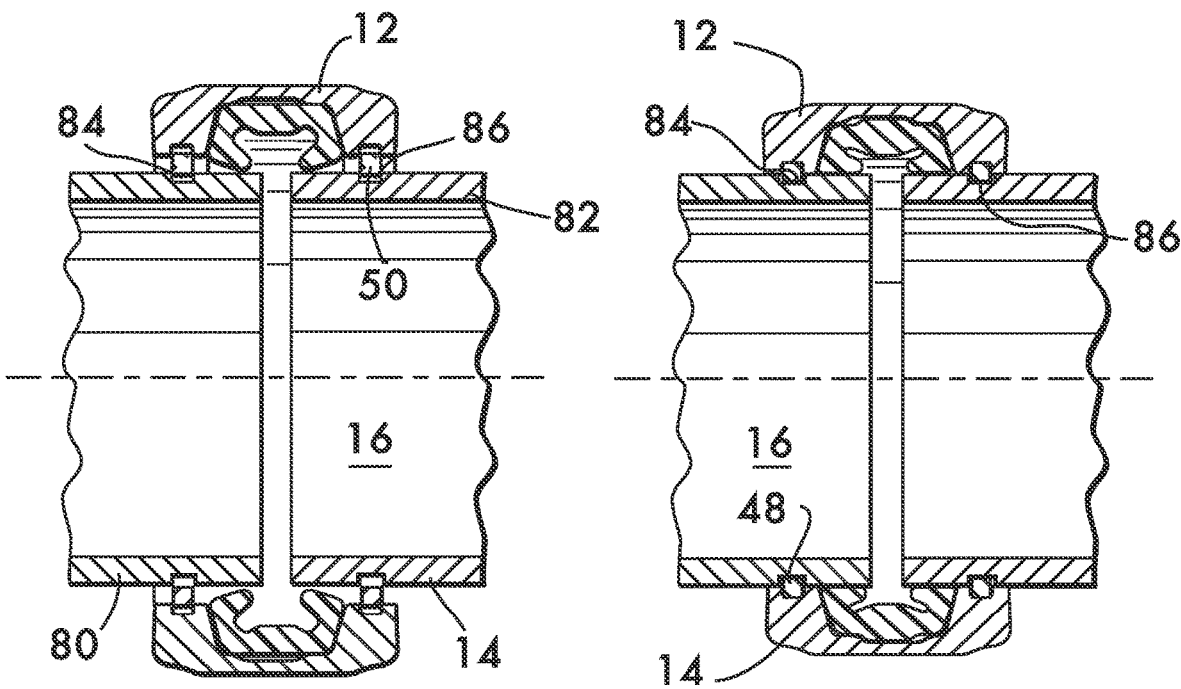
FIG. 9
FIG. 10

SPLIT RING COUPLING AND FITTING

CROSS REFERENCE TO RELATED APPLICATIONS

This application is a continuation of and claims benefit of priority to U.S. patent application Ser. No. 16/509,951, filed Jul. 12, 2019, now abandoned, which application is a Continuation of U.S. patent application Ser. No. 15/267,735, filed Sep. 16, 2016, now U.S. Pat. No. 10,371,295, issued Aug. 6, 2019, which application is a Continuation in Part of and claims benefit of priority to U.S. patent application Ser. No. 14/574,984, filed Dec. 18, 2014, now U.S. Pat. No. 10,100,957, issued Oct. 16, 2018, which patent is a non-provisional of and claims benefit of priority to U.S. Provisional Patent Application No. 61/920,138, filed Dec. 23, 2013, all aforementioned applications and patents being hereby incorporated by reference herein.

FIELD OF THE INVENTION

This invention relates to mechanical pipe couplings and fittings for joining pipe elements.

BACKGROUND

Prior art mechanical couplings and fittings for joining pipe elements together end-to-end comprise interconnectable segments or housing portions that are positionable circumferentially surrounding the end portions of co-axially aligned pipe elements. The term "pipe element" is used herein to describe any pipe-like item or component having a pipe-like form. Pipe elements include pipe stock, pipe fittings such as elbows, caps and tees as well as fluid control components such as valves, reducers, strainers, restrictors, pressure regulators and the like.

Each mechanical coupling segment or housing portion has arcuate surfaces which project radially inwardly and engage plain end pipe elements, shoulder end pipe elements, shoulder and bead pipe elements or circumferential grooves that extend around each of the pipe elements to be joined. Engagement between the arcuate surfaces and the pipe elements provides mechanical restraint to the joint and ensures that the pipe elements remain coupled even under high internal pressure and external forces. The segments and housing portions define an annular channel that receives a sealing element, typically an elastomeric ring which engages the ends of each pipe element and cooperates with the segments or housing portions to provide a fluid tight seal. The segments and housing portions have connection members, typically in the form of lugs which project outwardly from the segments and housing portions. The lugs are adapted to receive fasteners, such as nuts and bolts, which are adjustably tightenable to draw the segments or housing portions toward one another.

To ensure a good fit between the couplings or fittings and the pipe elements, the arcuate surfaces according to the prior art have a radius of curvature that is substantially matched to the radius of curvature of the outer surface of the pipe element that it is intended to engage. For couplings or fittings used with grooved pipe elements, the radii of curvature of the arcuate surfaces are smaller than the radii of curvature of the outer surfaces of the pipe elements outside of the grooves so that the arcuate surfaces fit within and engage the grooves properly.

This geometrical relation between the arcuate surfaces of the couplings or fittings and the outer surfaces of the pipe elements according to the prior art results in a time consuming installation process when mechanical couplings or fittings are used. Typically, the coupling or fitting is received by the technician with the segments or housing portions bolted together and the sealing element captured within the segments or housing portions. The technician first disassembles the coupling or fitting by unbolting it, removes the sealing element, lubricates it (if not pre-lubricated) and places it around the ends of the pipe elements to be joined. Installation of the sealing element requires that it be lubricated and stretched significantly to accommodate the pipe elements, an often difficult and messy task, as the sealing element is usually stiff and the lubrication makes manual manipulation of the seal difficult. With the sealing element in place on both pipe elements, the segments or housing portions are then placed one at a time straddling the ends of the pipe elements and capturing the sealing element against them. During placement, the segments or housing portions engage the sealing element, the arcuate surfaces are aligned with the grooves when present, or with alignment marks made on the outside surfaces of the pipe elements, the bolts are inserted through the lugs, the nuts are threaded onto the bolts and tightened, drawing the coupling segments or housing portions toward one another, compressing the sealing element and engaging the arcuate surface within the grooves.

As evident from the previous description, installation of mechanical pipe couplings and fittings according to the prior art requires that the technician typically handle at least seven individual piece parts (and more when the coupling has more than two segments), and must totally disassemble and reassemble the coupling or fitting. Significant time, effort and expense would be saved if the technician could install a mechanical pipe coupling or fitting without first totally disassembling it and then reassembling it, piece by piece.

SUMMARY

The invention concerns a fitting for connecting at least two pipe elements together. In one example embodiment the fitting comprises first and second housing portions attached to one another in spaced apart relation and defining at least first and second receptacles for receiving the pipe elements. The first and second receptacles respectively surround first and second axes. The first axis is oriented coaxially with the first receptacle, the second axis is oriented coaxially with the second receptacle. The first axis is angularly oriented with respect to the second axis. The housing portions further define a fluid path extending between the first and second receptacles. By way of example each of the housing portions comprise a first groove extending circumferentially about the first receptacle, and a second groove extending circumferentially about the second receptacle. Each of the grooves is define by two side surfaces arranged in spaced relation and a floor surface extending therebetween. Each floor surface comprises first and second surface portions arranged respectively at opposite ends of each the groove, and a third surface portion positioned therebetween. The first and second surface portions each have a greater radius of curvature than the third surface portion. A first split ring is positioned within the first groove and a second split ring is positioned within the second groove. The first and second split rings engage the first and second surface portions of the floors in the first and second grooves.

In an example embodiment the first and second split rings support the housing portions in the spaced apart relation. By way of further example at least one of the split rings has an outer radius of curvature and an inner radius of curvature. The inner radius of curvature is at least equal to an outer radius of one of the pipe elements. In an example embodiment, the radius of curvature of the first and second surface portions on at least one of the housing portions is equal to the outer radius of curvature of the at least one split ring. In a further example, at least one of the split rings supports the housing portions in a preassembled state in spaced apart relation sufficient to allow the pipe elements to be inserted into the first and second receptacles. By way of example, at least one split ring has sufficient stiffness to maintain the housing portions in the preassembled state through handling of the fitting during insertion of the pipe elements.

In an example embodiment at least one of the first and second surface portions has a length extending from about 5% to about 30% of a total length of at least one of the grooves. In a particular example embodiment at least one of the split rings has a rectangular cross sectional shape. By way of example, at least one of the split rings comprises a plurality of teeth arranged in spaced relation to one another and extending circumferentially around the at least one split ring. The teeth project toward one of the first and second axes.

An example fitting further comprises a first seal positioned within the first receptacle, a second seal positioned within the second receptacle, and a tube extending within the housing portions between the first and second seals. By way of example the first and second seals each comprise a flexible, resilient ring having ring inner surfaces adapted to engage outer surfaces of the pipe elements. The ring inner surfaces have a diameter sized to receive the pipe elements upon insertion of the pipe elements into the first and second receptacles. By way of example, the housing portions comprise adjustably tightenable connection members for drawing the housing portions toward one another. In an example embodiment, the adjustably tightenable connection members include a plurality of fasteners. The fasteners extends between the housing portions and holding the housing portions together in a preassembled state.

In an example fitting, at least a first angularly oriented surface is located on the first housing portion. At least a second angularly oriented surface is located on the second housing portion. The first and second angularly oriented surfaces are in facing relation and slide over one another when the fasteners are tightened to bring the first and second angularly oriented surfaces into contact. Sliding motion between the first and second angularly oriented surfaces causes the first and second housing portions to rotate in opposite directions relatively to one another.

The invention encompasses a fitting for connecting at least two pipe elements together. In an example embodiment the fitting comprises first and second housing portions attached to one another in spaced apart relation and defining at least first and second receptacles for receiving the pipe elements. The first and second receptacles respectively surround first and second axes. The first axis is oriented coaxially with the first receptacle, and the second axis oriented coaxially with the second receptacle. The first axis is angularly oriented with respect to the second axis. The housing portions further define a fluid path extending between the first and second receptacles. By way of example, each of the housing portions comprise a groove extending circumferentially about the first receptacle. The groove is defined by two side surfaces arranged in spaced relation and a floor surface extending therebetween. The floor surface comprises first and second surface portions arranged respectively at opposite ends of the groove and a third surface portion positioned therebetween. The first and second surface portions each have a greater radius of curvature than the third surface portion. A split ring is positioned within the groove. The split ring engages the first and second surface portions of the floor surface.

In an example embodiment, the split ring supports the housing portions in the spaced apart relation. By way of further example the split ring has an outer radius of curvature and an inner radius of curvature. The inner radius of curvature is at least equal to an outer radius of one of the pipe elements. In an example embodiment, the radius of curvature of the first and second surface portions on at least one of the housing portions is equal to the outer radius of curvature of the split ring. By way of example, the split ring supports the housing portions in a preassembled state in spaced apart relation sufficient to allow one of the pipe elements to be inserted into the first receptacle.

In a specific example embodiment, at least one of the first and second surface portions has a length extending from about 5% to about 30% of a total length of the groove. By way of further example, a first seal is positioned within the first receptacle, a second seal positioned within the second receptacle, and a tube extending within the housing portions between the first and second seals. In a specific example embodiment, the first and second seals each comprise a flexible, resilient ring having a ring inner surface adapted to engage outer surfaces of the pipe elements. The ring inner surfaces have a diameter sized to receive the pipe elements upon insertion of the pipe elements into the first and second receptacles. In a further example, the housing portions comprise adjustably tightenable connection members for drawing the housing portions toward one another.

The invention encompasses a fitting for connecting at least two pipe elements together. In an example embodiment the fitting comprises first and second housing portions attached to one another in spaced apart relation and defining at least first and second receptacles for receiving the pipe elements. The first and second receptacles have respective first and second back walls respectively surrounding first and second axes. The first axis is oriented coaxially with the first receptacle, and the second axis is oriented coaxially with the second receptacle. The first axis is angularly oriented with respect to the second axis. The housing portions further define a fluid path extending between the first and second receptacles. By way of example each of the housing portions comprise a first groove extending circumferentially about the first receptacle and a second groove extending circumferentially about the second receptacle. Each of the grooves is defined by two side surfaces arranged in spaced relation and a floor surface extending therebetween. The floor surface of the first groove faces the first axis, the floor surface of the second groove faces the second axis. A first split ring is positioned within the first groove and a second split ring positioned within the second groove. At least one of the first and second split rings engage at least one of the floor surfaces in one of the first and second grooves and thereby support the housing portions in the spaced apart relation. In this example, for at least one of the housing portions, a distance between the first back wall and the floor surface of the first groove, as measured along a radially projecting line extending from the first axis, is a first value at a first point midway between opposite ends of the first groove, and a second value at a second point proximate to one of the ends of the first groove, the first value being greater than the second value.

In an example embodiment, the first and second split rings support the housing portions in the spaced apart relation. By way of example, at least one of the split rings has an outer radius of curvature and an inner radius of curvature. The inner radius of curvature is at least equal to an outer radius of one of the pipe elements. Further by way of example, a radius of curvature of the floor surface proximate to the one end of the first groove on the at least one housing portion is equal to the outer radius of curvature of the at least one split ring. In an example embodiment, the at least one split ring supports the housing portions in a preassembled state in spaced apart relation sufficient to allow the pipe elements to be inserted into the receptacles. By way of example, the at least one split ring has sufficient stiffness to maintain the housing portions in the preassembled state through handling of the fitting during insertion of the pipe elements. In a particular example, a distance between the first back wall and the floor surface of the first groove, as measured along a radially projecting line extending from the first axis, is a third value at a third point proximate to another one of the ends of the first groove, the third value being equal to the second value.

In a specific example, at least one of the split rings has a rectangular cross sectional shape. Further by way of example, at least one of the split rings comprises a plurality of teeth arranged in spaced relation to one another and extending circumferentially around the at least one split ring. The teeth project toward one of the first and second axes. By way of further example, a first seal is positioned within the first receptacle, a second seal is positioned within the second receptacle, and a tube extends within the housing portions between the first and second seals. In an example embodiment, the first and second seals each comprise a flexible, resilient ring having ring inner surfaces adapted to engage outer surfaces of the pipe elements. The ring inner surfaces have a diameter sized to receive the pipe elements upon insertion of the pipe elements into the first and second receptacles. By way of example, the housing portions comprise adjustably tightenable connection members for drawing the housing portions toward one another. In a specific example embodiment, the adjustably tightenable connection members include a plurality of fasteners. The fasteners extend between the housing portions and hold the housing portions together in a preassembled state.

By way of example, a fitting further comprises at least a first angularly oriented surface located on the first housing portion, and at least a second angularly oriented surface located on the second housing portion. The first and second angularly oriented surfaces being in facing relation and sliding over one another when the fasteners are tightened to bring the first and second angularly oriented surfaces into contact. Sliding motion between the first and second angularly oriented surfaces causes the first and second housing portions to rotate in opposite directions relatively to one another.

The invention encompasses a fitting for connecting at least two pipe elements together. By way of example, the fitting comprises first and second housing portions attached to one another in spaced apart relation and defining at least first and second receptacles for receiving the pipe elements. The first and second receptacles have respective first and second back walls respectively surrounding first and second axes. The first axis is oriented coaxially with the first receptacle, the second axis oriented coaxially with the second receptacle, and the first axis is angularly oriented with respect to the second axis. The housing portions further defining a fluid path extending between the first and second receptacles. In an example embodiment, each of the housing portions comprise at least one groove extending circumferentially about the first receptacle. The at least one groove is defined by two side surfaces arranged in spaced relation and a floor surface extending therebetween. The floor surface of the at least one groove faces the first axis. A split ring is positioned within the at least one groove. The split ring engages the floor surface of the at least one groove proximate to opposite ends of the at least one groove and supports the housing portions in the spaced apart relation. In an example embodiment, for at least one housing portion, a distance between the back wall and the floor surface of the at least one groove, as measured along a radially projecting line extending from the first axis, is a first value at a first point midway between opposite ends of the at least one groove, and a second value at a second point proximate to one of the ends of the at least one groove, the first value being greater than the second value.

In an example embodiment, the split ring has an outer radius of curvature and an inner radius of curvature. The inner radius of curvature is at least equal to an outer radius of one of the pipe elements. By way of example, a radius of curvature of the floor surface proximate to the one end of the first groove on the at least one housing portion is equal to the outer radius of curvature of the split ring. In an example embodiment, the split ring supports the housing portions in a preassembled state in spaced apart relation sufficient to allow one the pipe element to be inserted into the first receptacle. In a particular example, the split ring has sufficient stiffness to maintain the housing portions in the preassembled state through handling of the fitting during insertion of the pipe elements.

In an example embodiment, a distance between the first back wall and the floor surface of the first groove, as measured along a radially projecting line extending from the first axis, is a third value at a third point proximate to another one of the ends of the first groove, the third value being equal to the second value. In a particular embodiment, the split ring has a rectangular cross sectional shape. By way of further example, the split ring comprises a plurality of teeth arranged in spaced relation to one another and extending circumferentially around the split ring. The teeth project toward the first axis.

An example fitting further comprises a first seal positioned within the first receptacle. A second seal is positioned within the second receptacle, and a tube extends within the housing portions between the first and second seals. By way of example, the first and second seals each comprise a flexible, resilient ring having ring inner surfaces adapted to engage outer surfaces of the pipe elements. The ring inner surfaces have a diameter sized to receive the pipe elements upon insertion of the pipe elements into the first and second receptacles. By way of example, the housing portions comprise adjustably tightenable connection members for drawing the housing portions toward one another. In a specific example the adjustably tightenable connection members include a plurality of fasteners. The fasteners extend between the housing portions and hold the housing portions together in a preassembled state.

An example fitting further comprises at least a first angularly oriented surface located on the first housing portion. At least a second angularly oriented surface located the second housing portion. The first and second angularly oriented surfaces are in facing relation and slide over one another when the fasteners are tightened to bring the first and second angularly oriented surfaces into contact. Sliding motion between the first and second angularly oriented surfaces cause the first and second housing portions to rotate in opposite directions relatively to one another.

The invention encompasses a fitting for connecting at least two pipe elements together. In an example embodiment, the fitting comprises first and second housing portions attached to one another in spaced apart relation and defining at least first and second receptacles for receiving the pipe elements. The first and second receptacles respectively surround first and second axes. The first axis is oriented coaxially with the first receptacle, the second axis is oriented coaxially with the second receptacle, and the first axis is angularly oriented with respect to the second axis. The housing portions further define a fluid path extending between the first and second receptacles. By way of example, each of the housing portions comprise a first groove extending circumferentially about the first receptacle and a second groove extending circumferentially about the second receptacle. Each of the grooves is defined by two side surfaces arranged in spaced relation and a floor surface extending therebetween. Each floor surface comprises first and second surface portions arranged respectively at opposite ends of the grooves and a third surface portion positioned therebetween. The first and second surface portions each have a center of curvature offset from a center of curvature of the third surface portion. A first split ring is positioned within the first groove and a second split ring positioned within the second groove. The first and second split rings engage the first and second surface portions of the floors in the first and second grooves and supporting the housing portions in the spaced apart relation.

The invention also includes a coupling for joining pipe elements in end to end relation. In an example embodiment the coupling comprises a plurality of segments attached to one another end to end in a preassembled state. In the preassembled state the segments are in spaced apart relation and surround a central axis. When in the preassembled state the segments define a central space prior to receiving the pipe elements. Each of the segments has a channel defined by a back wall extending between the ends. Each of the back walls has a surface facing the central axis. Each of the segments has at least one groove extending between the ends of the segments. The at least one groove is positioned adjacent to the channel. The at least one groove is defined by two side surfaces arranged in spaced relation and a floor surface extending therebetween. The floor surface faces the central axis. A split ring is positioned within the at least one groove. For at least the one segment, a distance between the surface of the back wall and the floor surface, as measured radially from the central axis, is a first value at a first point midway between the ends of the at least one segment, and a second value at a second point proximate to at least one of the ends of the at least one segment. The first value is greater than the second value.

Further by way of example the split ring engages the floor surface in at least one of the grooves proximate to the ends of at least one of the segments. The split ring supports the segments in the spaced apart relation in this example.

In a specific example the split ring has an outer radius of curvature and an inner radius of curvature. The inner radius of curvature is at least equal to an outer radius of the pipe elements in this example.

Further by way of example, the floor surfaces may comprise respective first and second surface portions arranged respectively at opposite ends of the segments. Each floor surface has a respective radius of curvature. The respective radii of curvature of the first and second surface portions are substantially equal to the outer radius of curvature of the split ring in this example.

By way of example, the split ring supports the segments in the preassembled state in spaced apart relation sufficient to allow the pipe elements to be inserted into the central space.

In a further example, at least one of the first and second surface portions has a length extending from about 5% to about 30% of a total length of at least one of the grooves.

An example embodiment according to the invention further comprises a seal positioned within the channels of the segments. In another example embodiment the segments comprise adjustably tightenable connection members for drawing the segments toward the central space.

BRIEF DESCRIPTION OF THE DRAWINGS

FIG. 1 is an axial view of an example pipe coupling according to the invention;
FIG. 5A is a longitudinal sectional view of the pipe coupling shown in FIGS. 4 and 5;
FIGS. 6 and 7 are isometric views of example seals used with the pipe couplings according to the invention;
FIGS. 8-10 are longitudinal sectional views illustrating a method of using the pipe couplings according to the invention;
FIG. 11 is an axial view of an example coupling according to the invention.

DETAILED DESCRIPTION

Figure 1A:
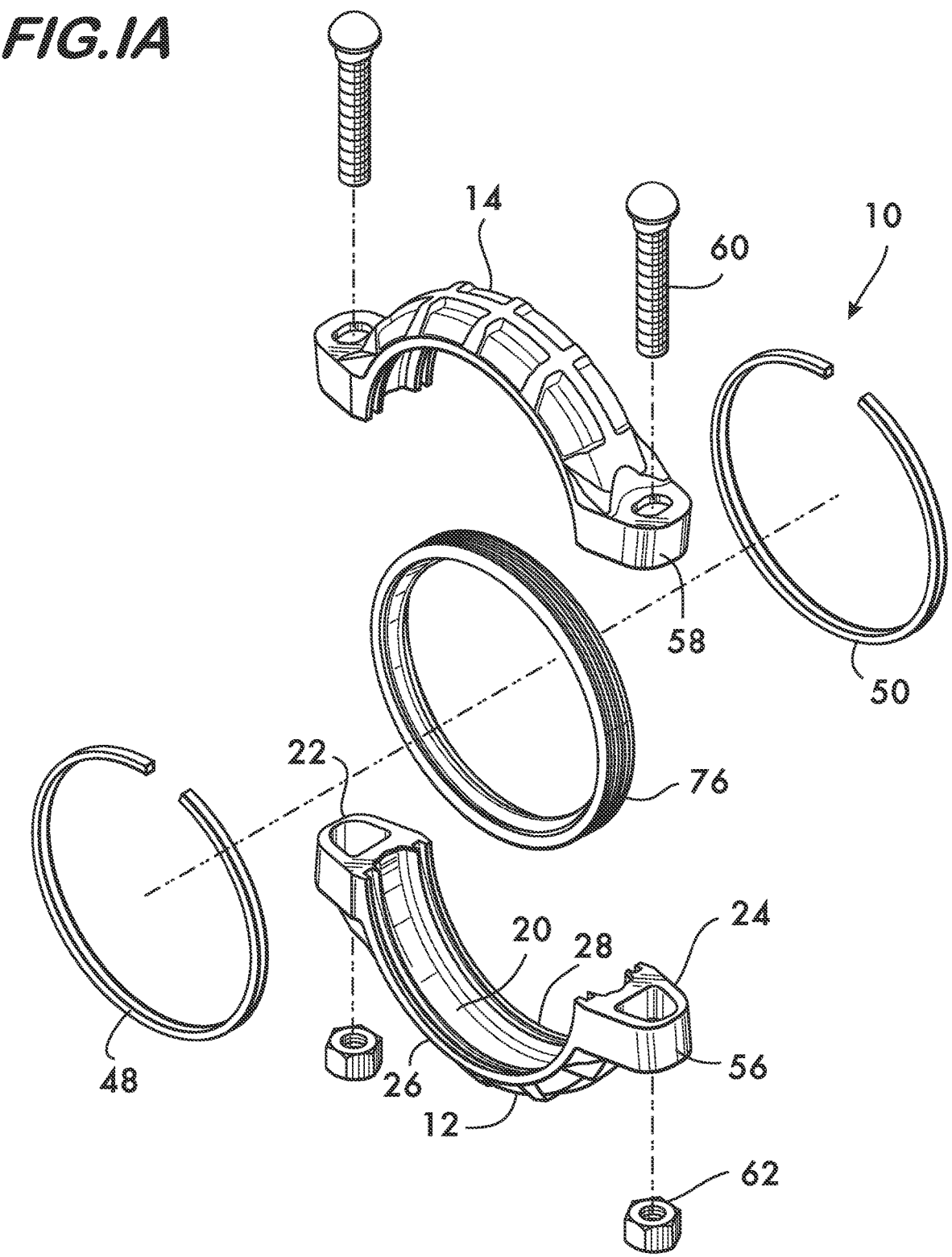
FIG. 1A is an isometric exploded view of the pipe coupling shown in FIG. 1.
Figure 2:
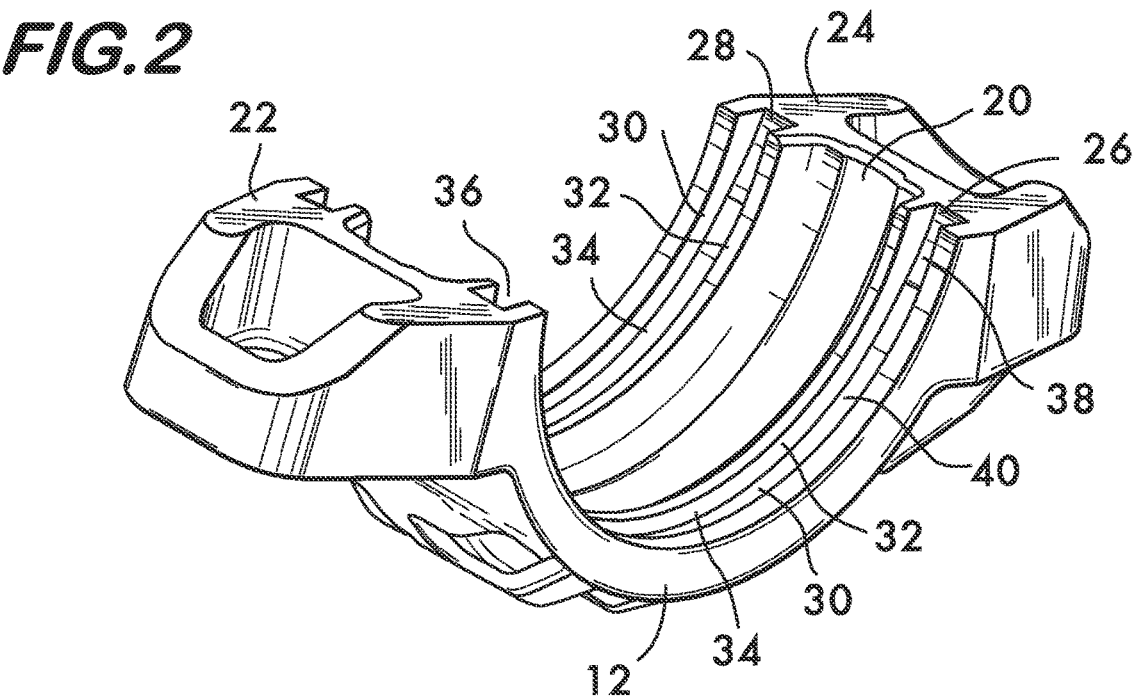
FIG. 2 is an isometric view of a segment from the pipe coupling shown in FIG. 1.

FIGS. 1 and 1A show an example coupling 10 according to the invention. Coupling 10 comprises a plurality of segments, in this example, two segments 12 and 14 attached to one another end to end surrounding a central space 16. As shown in FIG. 2, each of the segments 12 and 14 (12 shown) has a channel 20 that extends between the ends 22 and 24 of the segments. Each segment 12 and 14 also has first and second grooves 26 and 28. Grooves 26 and 28 extend between ends 22 and 24 of the segments and are positioned in spaced relation from one another on opposite sides of the channel 20. Each groove 26 and 28 is defined by two side surfaces 30 and 32, arranged in spaced relation, and a floor surface 34 that extends between the side surfaces. As shown in FIGS. 2 and 3, floor surface 34 comprises three surface portions 36, 38 and 40. The first and second surface portions 36 and 38 are arranged, respectively, at opposite ends 22 and 24 of the segments 12 and 14. The third surface portion 40 is positioned between the first and second surface portions 36 and 38. Each of the first and second surface portions 36 and 38 has a respective radius of curvature 42 and 44, and these radii are larger than the radius of curvature 46 of the third surface portion 40. The first and second surface portions 36 and 38 advantageously have a length from about 5% to about 30% of the total length of one of the grooves 26, 28.

As shown in FIGS. 1, 1A and 3, coupling 10 includes first and second split rings 48 and 50. Split ring 48 is positioned within groove 26 and split ring 50 is positioned within groove 28 of the segments 12 and 14. With reference to FIG. 3, the split rings (48 being shown) have an outer radius of curvature 52 and an inner radius of curvature 54. In their undeformed state, the outer radii of curvature 52 of the split rings is sized so that the split rings 48 and 50 engage the first and second surface portions 36 and 38 of floor surface 34 and thereby support the segments 12 and 14 in spaced apart relation sufficient to permit pipe elements to be inserted into the central space 16 as described in detail below. This spaced configuration of the segments (shown in FIGS. 1 and 3) is known as the "preassembled state", and the stiffness of the split rings 48 and 50 is sufficient to maintain the segments 12 and 14 in this preassembled state during shipping, handling and assembly of the joint. It is advantageous that the radii of curvature 42 and 44 of the first and second surface portions 36 and 38 of the floor surface 34 of the grooves 26 and 28 be substantially equal to the radii of curvature of the split rings 48 and 50 in their undeformed state. Further to this end, when in their undeformed state, the inner radii of curvature 54 of the split rings 48 and 50 are sized to be at least as large as the maximum radius of the pipe elements that the coupling 10 is intended to join. This permits insertion of the pipe elements into the central space 16 when the coupling 10 is in its preassembled state as described below.

Figure 4:
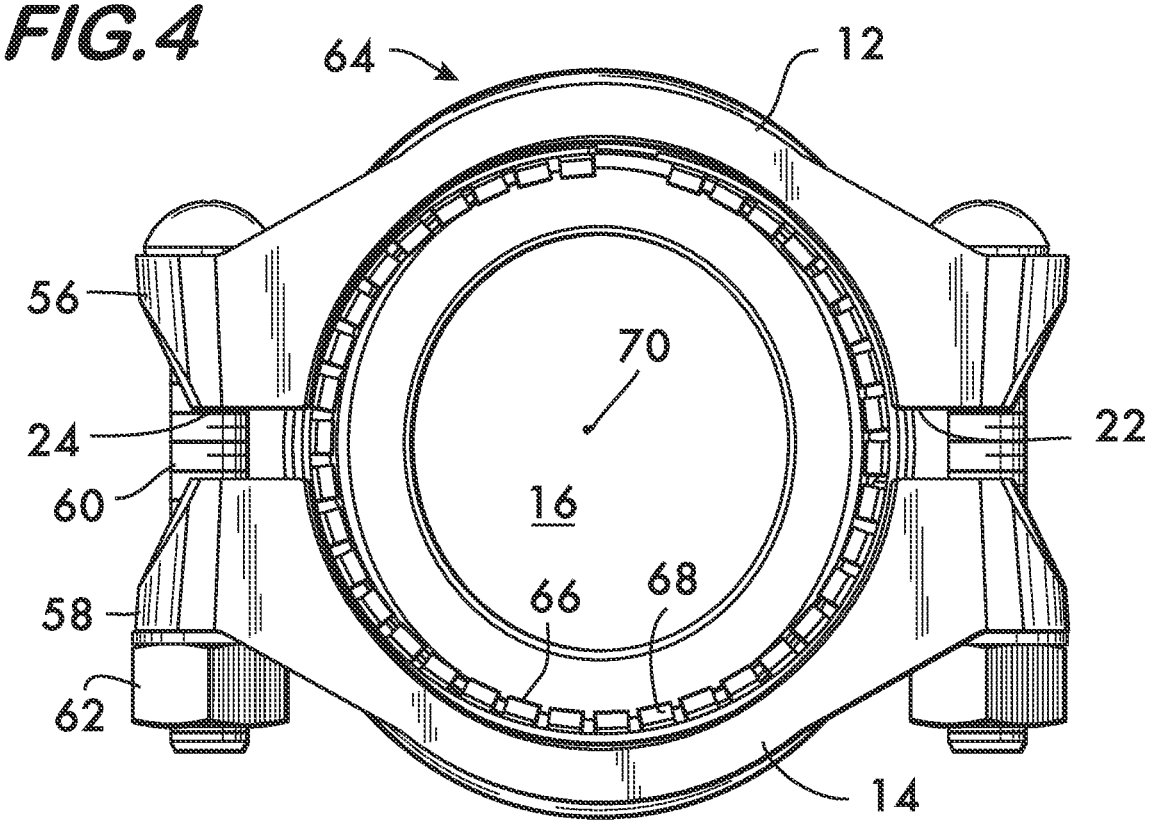
FIGS. 4 and 5 are axial views of another example embodiment of a pipe coupling according to the invention.
Figure 5:
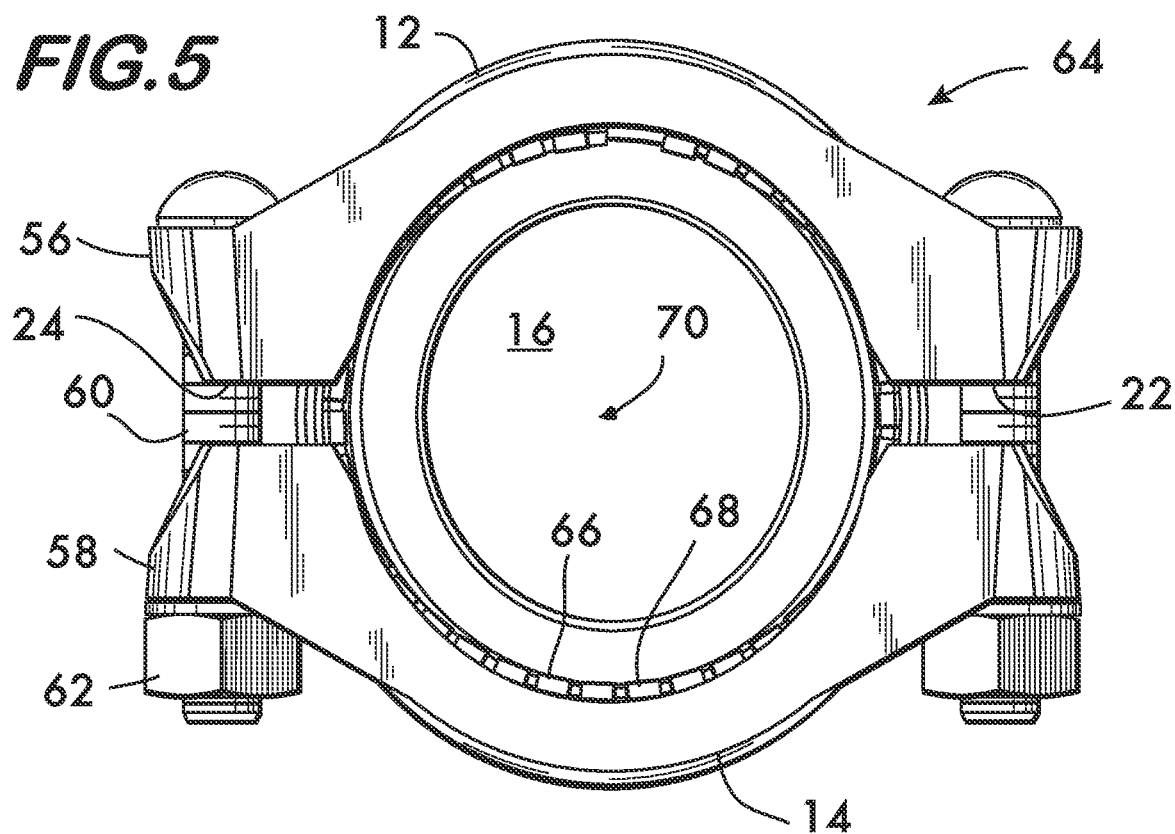

In the preassembled state, the segments 12 and 14 are attached to one another end to end surrounding the central space 16 and are supported in spaced relation to one another as shown in FIG. 1, the spacing being sufficient to permit pipe elements to be inserted between the segments 12 and 14 into the central space 16. Interconnection of the segments 12 and 14 is effected by connection members, preferably in the form of lugs 56 and 58 shown in FIGS. 1 and 2. The lugs are preferably positioned at each end of each segment and project outwardly from the segments. Lugs 56 and 58 are positioned in facing relation to one another and adapted to receive fasteners, preferably in the form of bolts 60 and nuts 62 which are adjustably tightenable and cooperate with the lugs 56 and 58 for adjustably connecting the coupling segments to one another as discussed in further detail below. The stiffness of the split rings 48 and 50, while sufficient to support the segments 12 and 14 in the spaced relation of the preassembled state, is not so great that it prevents the use of hand tools to tighten the bolts 60 and nuts 62 to draw the segments 12 and 14 toward the central space 16, thereby deforming the split rings to the point where their outer radii of curvature 52 are smaller and substantially equal to the radii of the third surface portion 40 of the grooves 26 and 28. The inner radii of curvature 54 also become smaller as the split rings deform to permit them to engage grooves in pipe elements and provide mechanical engagement between the coupling 10 and the pipe elements to retain the pipe elements to the coupling against externally applied forces as well as forces due to internal pressure within the pipe elements that would tend to cause separation of the joint. (Other types of pipe elements, for example, shouldered and shoulder and bead pipe elements may also be effectively engaged by the inner radii of curvature 54.) When used with grooved pipe elements it is advantageous that the split rings have a rectangular cross sectional shape (as shown in FIG. 1A) so as to provide substantially continuous engagement within the grooves. In an another coupling embodiment 64, shown in FIGS. 4, 5 and 5A, the split rings 66 comprise a plurality of teeth 68. Teeth 68 are arranged in spaced relation to one another and extend circumferentially around the split rings 66. Split rings 66 are used advantageously with plain end pipe elements. The teeth 68 project toward the center 70 of the central space 16 and are forced into engagement with the outer surface of the plain end pipe when the split rings 66 are deformed by tightening the bolts 60 and nuts 62 to draw segments 12 and 14 toward the central space 16. The teeth bite into the pipe elements to provide the desired mechanical engagement to secure the pipe elements to the coupling. Use of either type of split ring (toothed or rectangular cross section) is expected to provide pipe couplings with exceptional stiffness. The segments are advantageously formed of metal, such as iron, and the split rings may be formed of spring steel, stainless steel, beryllium copper, as well as polymers including plastics such as nylon and acrylonitrile butadiene styrene (ABS).

Figure 3B:
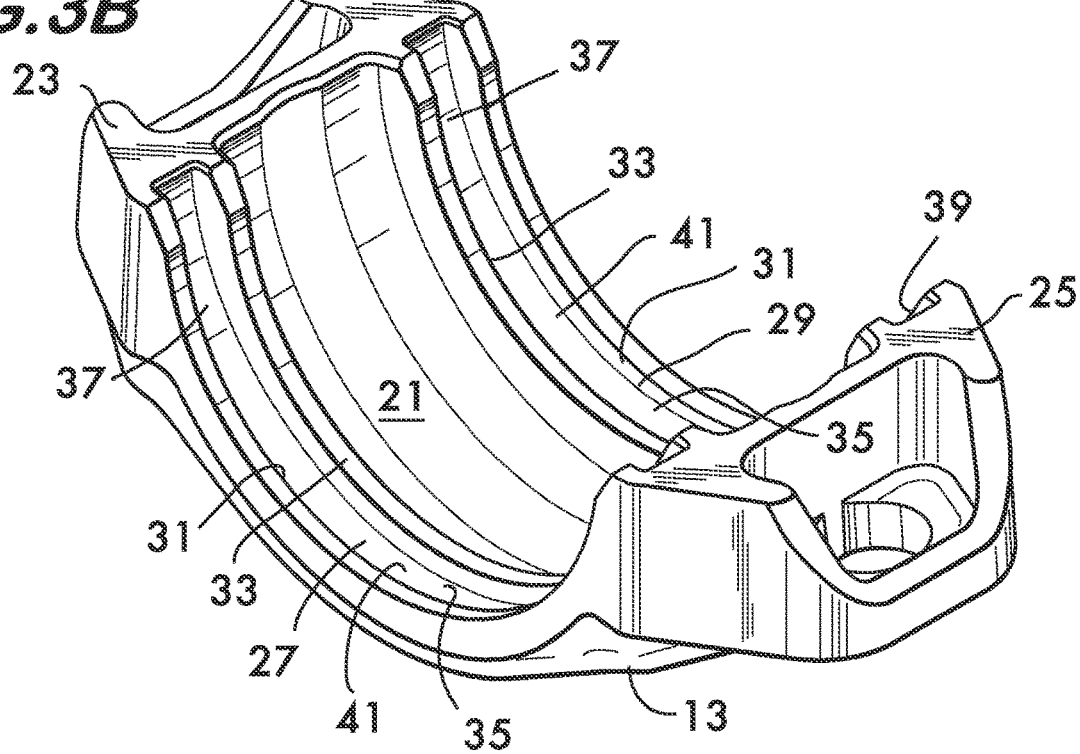
FIG. 3B is an isometric view of a segment from the pipe coupling shown in FIG. 3A.
Figure 3:
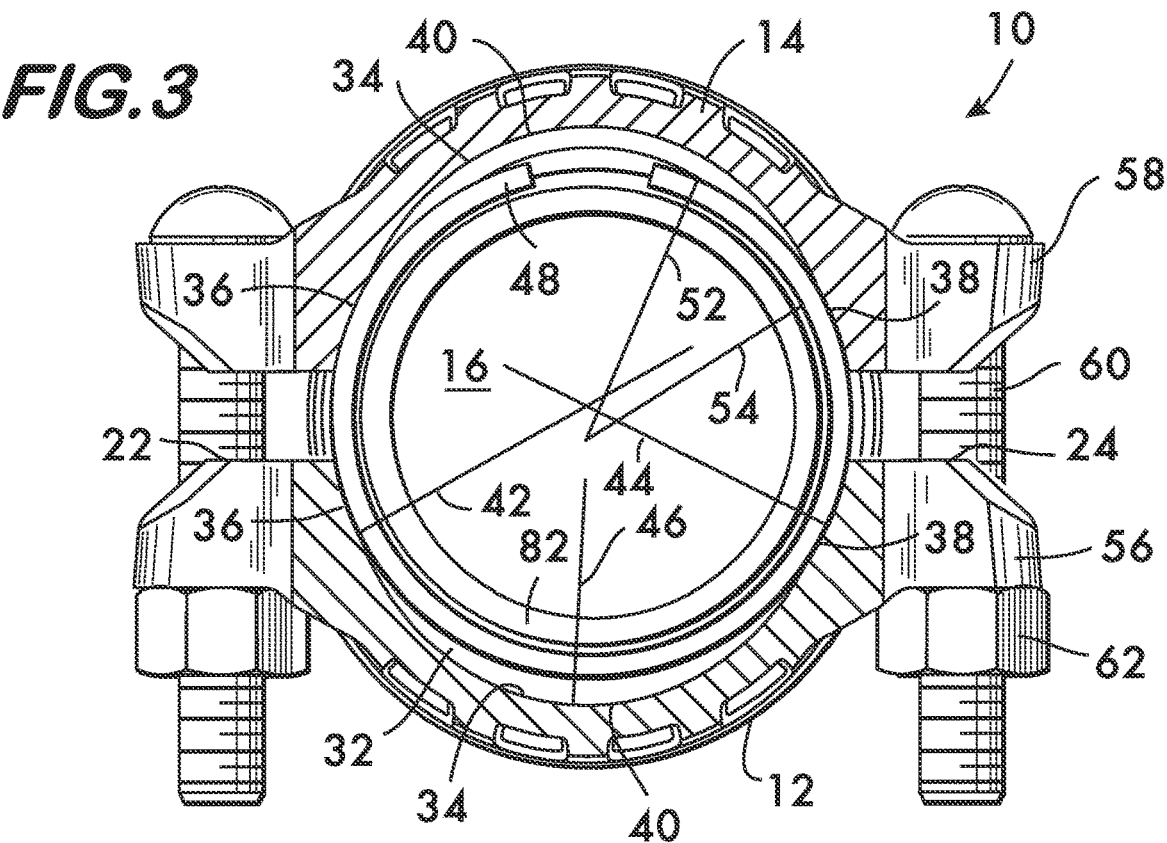
FIG. 3 is a partial cross sectional view of the pipe coupling shown in FIG. 1.
Figure 3A:
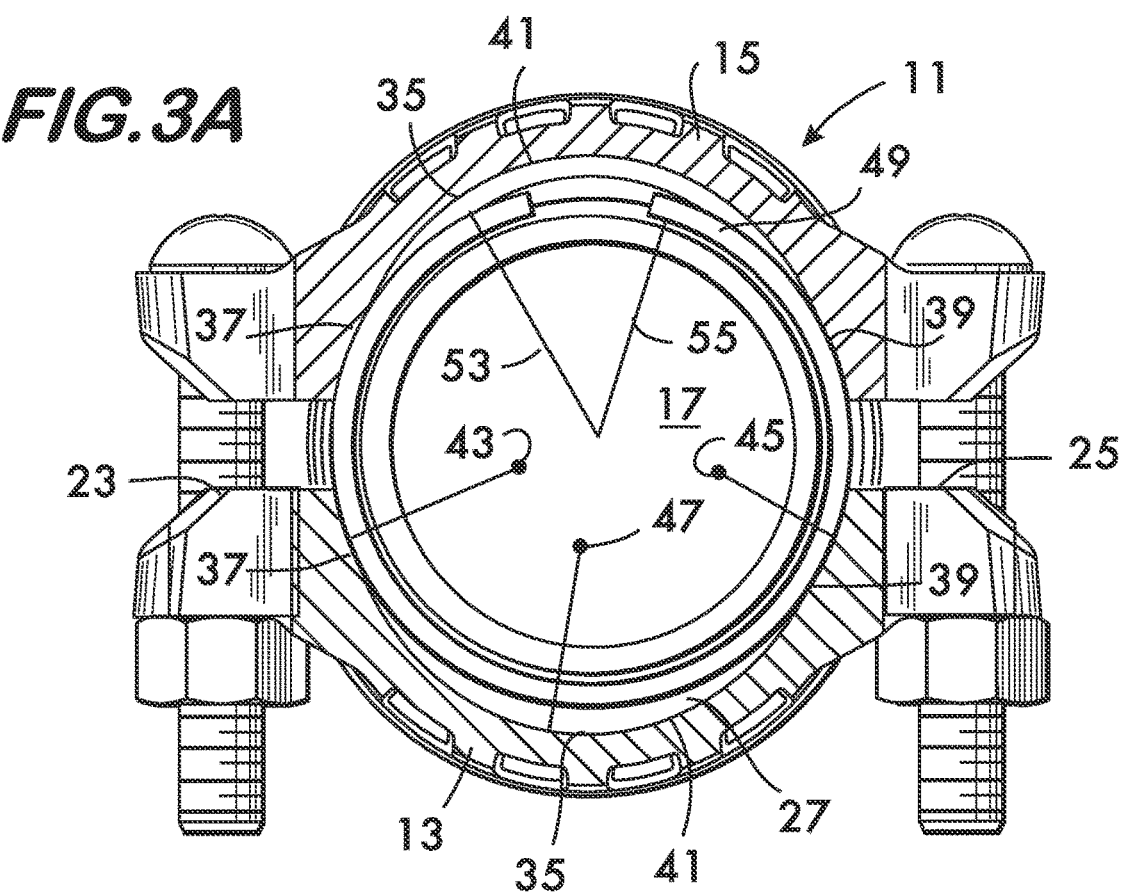
FIG. 3A is a partial cross sectional view of an example embodiment of a pipe coupling according to the invention.

FIGS. 3A and 3B show another example coupling 11 according to the invention. Similar to coupling 10, coupling 11 comprises a plurality of segments, in this example, two segments 13 and 15 attached to one another end to end surrounding a central space 17. As shown in FIG. 3B, each of the segments 13 and 15 (13 shown) has a channel 21 that extends between the ends 23 and 25 of the segments. Each segment 13 and 15 also has first and second grooves 27 and 29. Grooves 27 and 29 extend between ends 23 and 25 of the segments and are positioned in spaced relation from one another on opposite sides of the channel 21. Each groove 27 and 29 is defined by two side surfaces 31 and 33, arranged in spaced relation, and a floor surface 35 that extends between the side surfaces. As shown in FIGS. 3A and 3B, floor surface 35 comprises three surface portions 37, 39 and 41. The first and second surface portions 37 and 39 are arranged, respectively, at opposite ends 23 and 25 of the segments 13 and 15. The third surface portion 41 is positioned between the first and second surface portions 37 and 39. Each of the first and second surface portions 37 and 39 has a respective center of curvature 43 and 45, and these centers of curvature are offset from (i.e., not coincident with) the center of curvature 47 of the third surface portion 41. The first and second surface portions 37 and 39 advantageously have a length from about 5% to about 30% of the total length of one of the grooves 27, 29.

Similar to coupling 10, coupling 11 includes first and second split rings 49 and 51 (49 shown). Split ring 49 is positioned within groove 27 and split ring 51 is positioned within groove 29 of the segments 13 and 15 (see FIG. 3B). With reference to FIG. 3A, the split rings (49 being shown) have an outer radius of curvature 53 and an inner radius of curvature 55. In their undeformed state, the outer radii of curvature 53 of the split rings is sized so that the split rings 49 and 51 engage the first and second surface portions 37 and 39 of floor surface 35 and thereby support the segments 13 and 15 in spaced apart relation sufficient to permit pipe elements to be inserted into the central space 17 as described in detail below. This spaced configuration of the segments (shown in FIG. 3A) is known as the "preassembled state", and the stiffness of the split rings 49 and 51 is sufficient to maintain the segments 13 and 15 in this preassembled state during shipping, handling and assembly of the joint. It is advantageous if the radii of curvature of the first and second surface portions 37 and 39 of the floor surface 35 of the grooves 27 and 29 are substantially equal to the radii of curvature of the split rings 49 and 51 in their undeformed state. Further to this end, when in their undeformed state, the inner radii of curvature 55 of the split rings 49 and 51 are sized to be at least as large as the maximum radius of the pipe elements that the coupling 11 is intended to join. This permits insertion of the pipe elements into the central space 17 when the coupling 11 is in its preassembled state as described below. Note that for coupling 11, the radii of curvature of the first and second surface portions 37 and 39 have no required relationship to the radius of curvature of the third surface portion 41, unlike coupling 10, wherein the radii of curvature 42 and 44 of surface portions 36 and 38 are greater than the radius of curvature 46 of the third surface portion 40.

Figure 3C:
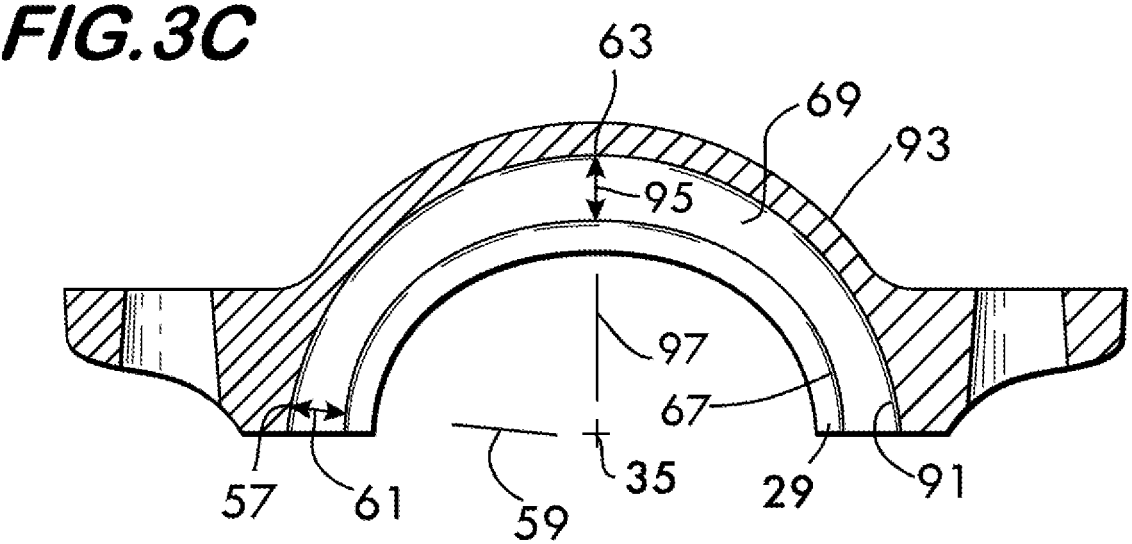
FIGS. 3C, 3D and 3E are cross sectional views of example embodiments of coupling segments according to the invention.

As shown in FIG. 3C, example coupling segments 93 according to the invention may also be described by the geometric relation between the back wall 91 extending between the ends of the segment and defining the channel 69, and the floor surface 67 of the groove 29 that receives the split rings (not shown). The geometric relation which permits the split rings to support the segments 93 in spaced relation as described above relates to a first distance 95, measured between the surface of back wall 91 and the floor surface 67 of groove 29 along a radially projecting line 97 between a central axis 35 (for example, the longitudinal axis of pipe elements being joined by the segment) and a point 63 midway between the ends of the segment 93, and a second distance 61, measured between the surface of back wall 91 and the floor surface 67 of groove 29 along a radially projecting line 59 between central axis 35 and a point 57 proximate to one end of the segment 93. The value of the first distance 95 is greater than the value of the second distance 61 for segments according to the invention.

Figure 3D:
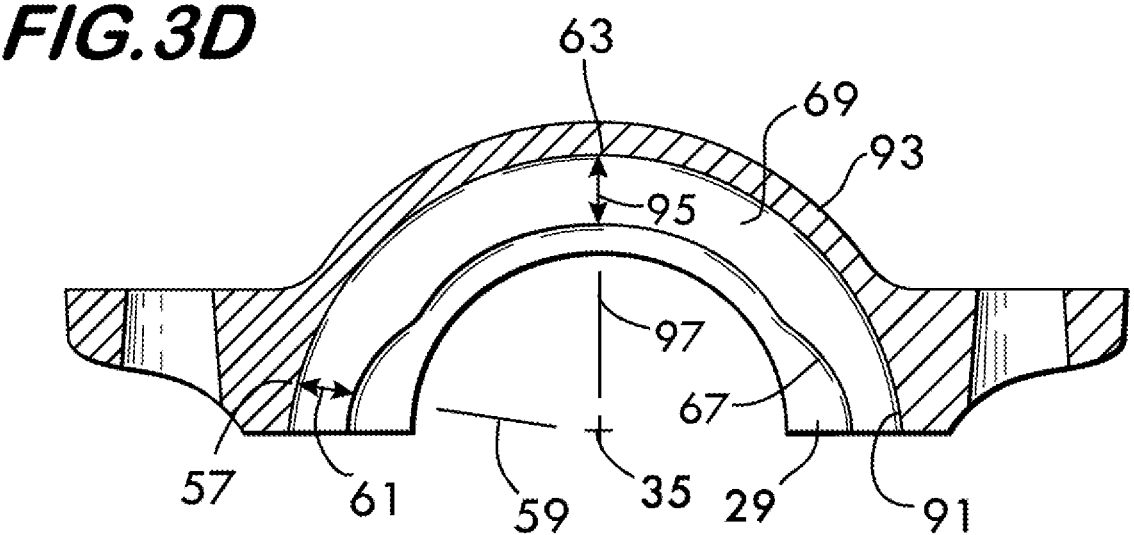
Figure 3E:
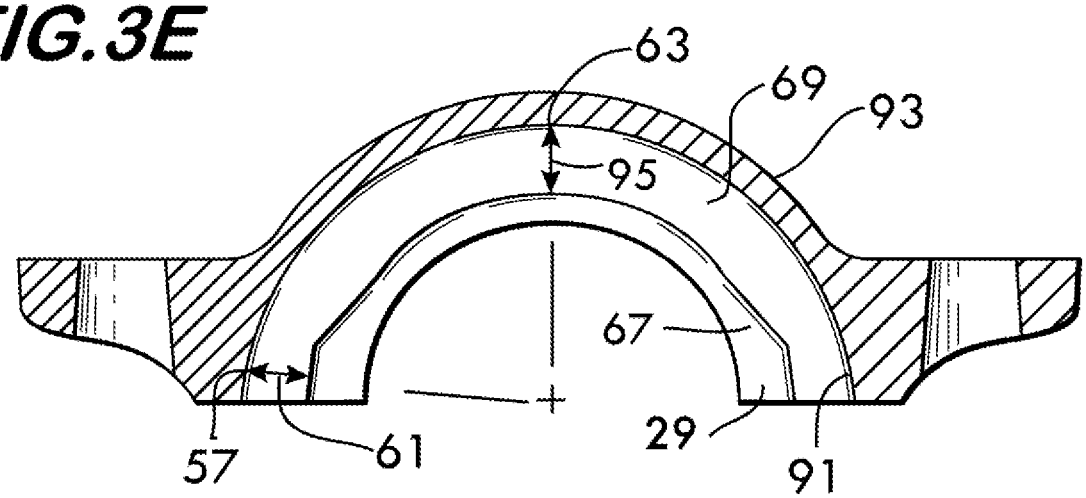

This geometric condition may be accomplished, for example as shown in FIG. 3C by continuously changing the curvature of the floor surface 67 as it traverses between the points 63 and 57. In another example, shown in FIG. 3D, the curvature of floor surface 67 is changed abruptly in the regions proximate to the ends of segment 93. FIG. 3E shows floor surface 67 formed of faceted, straight segments in the regions proximate to the ends of the segments to receive the split rings for support of the segments in spaced relation.

FIGS. 6 and 7 show examples of seals used with couplings 10, 11 and 64 according to the invention. Seal 72 (FIG. 6) is preferably a flexible, resilient ring formed from elastomeric material. The seal may have lips 74 that use the internal pressure within the pipes to increase the sealing force between the seal and the outer surfaces of the pipe elements. As shown in FIG. 7, another seal embodiment 76 may also have a tongue 78 positioned between the lips 74, the tongue extending circumferentially around the seal and projecting radially inwardly. Tongue 78 provides a stop surface that engages the ends of pipe elements to ensure proper positioning of the seal 76 relatively to the pipe elements. Engagement of the pipe elements with tongue 78 also effects alignment of the pipe engaging surfaces with the grooves (if present), or with alignment marks on the outside surface of the pipe elements. Seals 72 and 76 are received within channels 20 (see FIGS. 1A and 2) of the couplings 10 and 64.

Assembly of a pipe joint is illustrated in FIGS. 8-10. After both pipe elements 80 and 82 are inserted into coupling 10 as shown in FIGS. 8 and 9, nuts 62 are tightened (see also FIG. 1). The nuts 62 cooperate with their bolts 60 to draw the segments 12 and 14 toward the central space 16. Tightening of the nuts exerts a force on the lugs 56 and 58 which compresses the split rings 48 and 50 and causes them to deform such that they engage the outer surfaces of the pipe elements 80 and 82 within grooves 84 and 86. For plain end pipe (see FIGS. 4 and 5), compression of the split rings 66 causes their teeth 68 to bite into the outer surface of the pipe elements. Deformation of the split rings 48 and 50 is preferably substantially elastic, allowing them to spring back substantially to their original shape when the nuts 62 are loosened, thereby permitting the coupling 10 to be reused in the manner according to the invention as described herein. The split rings may also be designed to have significant plastic deformation, wherein the deformation imparts a permanent set to the rings. For practical couplings, there will generally be some degree of both plastic and elastic deformation occurring in the split rings as a result of tightening the fasteners. The seal 72 is also deformed by this process, with the lips 74 coming into full engagement with the pipe element outer surfaces. Because the seal 72 is substantially volumetrically incompressible, it must be provided with space into which it may expand when radially compressed by the segments.

The joint stiffness may be increased using coupling segments 71 and 73 as shown in FIG. 11. In addition to having the grooves and split rings as described above, segments 71 and 73 also have angularly oriented surfaces 75 (on segment 71) and 77 (on segment 73). Surfaces 75 and 77 in this example are located adjacent to the connection members 79 and 81. Surfaces 75 on segment 71 are in respective facing relation with surfaces 77 on segment 73. As the nuts 83 are tightened on bolts 85 the segments 71 and 73 are drawn toward one another and into contact so that the surfaces 75 engage and slide over surfaces 77. As the slopes of the surfaces 75 and 77 are opposite to one another on opposite ends of the couplings the sliding motion between the surfaces causes the segments 71 and 73 to rotate in opposite directions relatively to one another about axis 87 and force the split rings (not shown) to engage the side surfaces of the grooves in which they are received, thereby adding rigidity to the joint.

As shown in FIGS. 1 and 3, for the preassembled coupling 10, it is advantageous to hold nuts 62 in a position on bolts 60 that will maintain the segments 12 and 14 in the desired spaced apart relation as determined by contact between the segments and the split rings 48 and 50.

Figure 12:
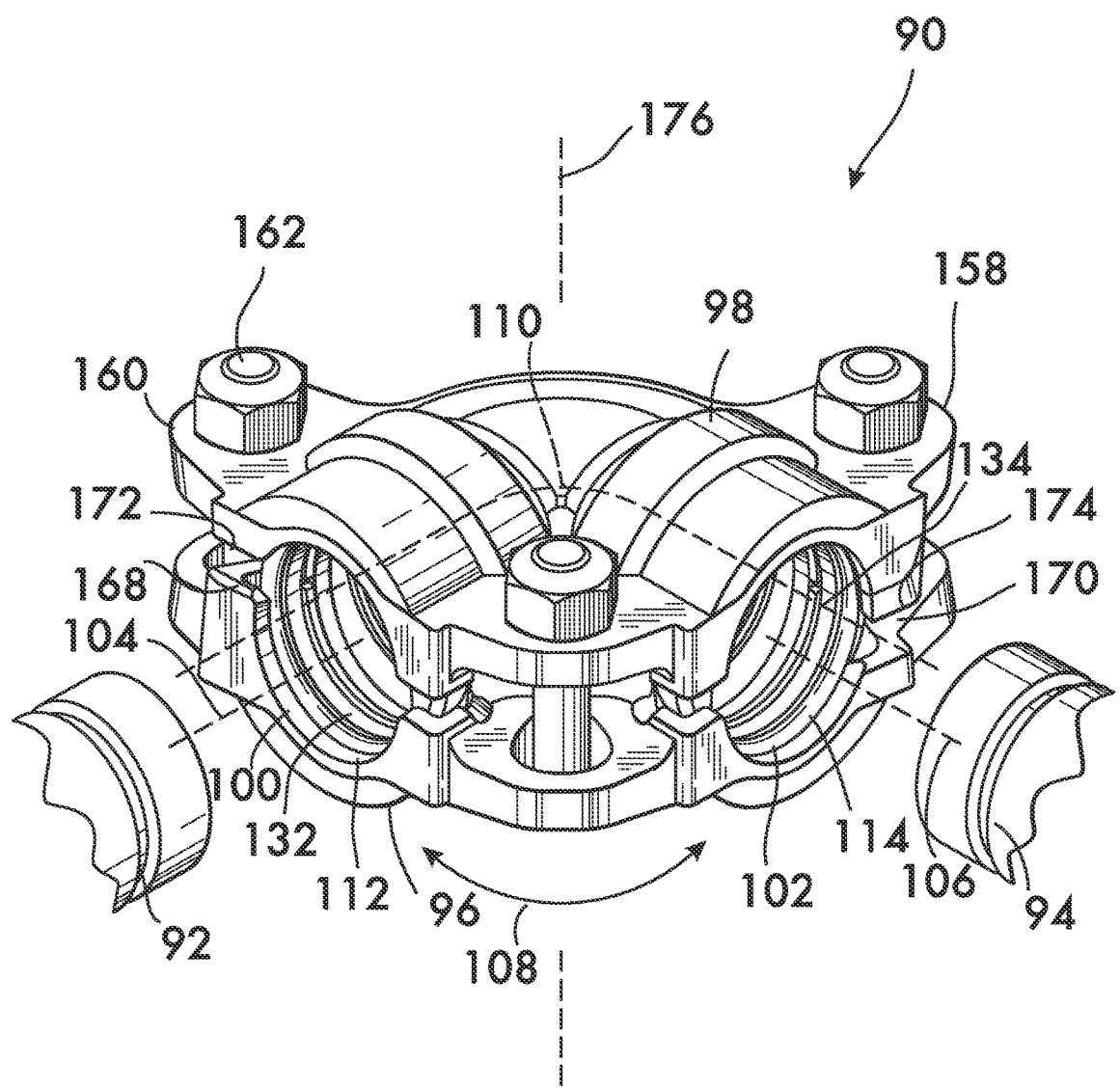
FIG. 12 is an isometric view of an example fitting according to the invention.
Figure 13:
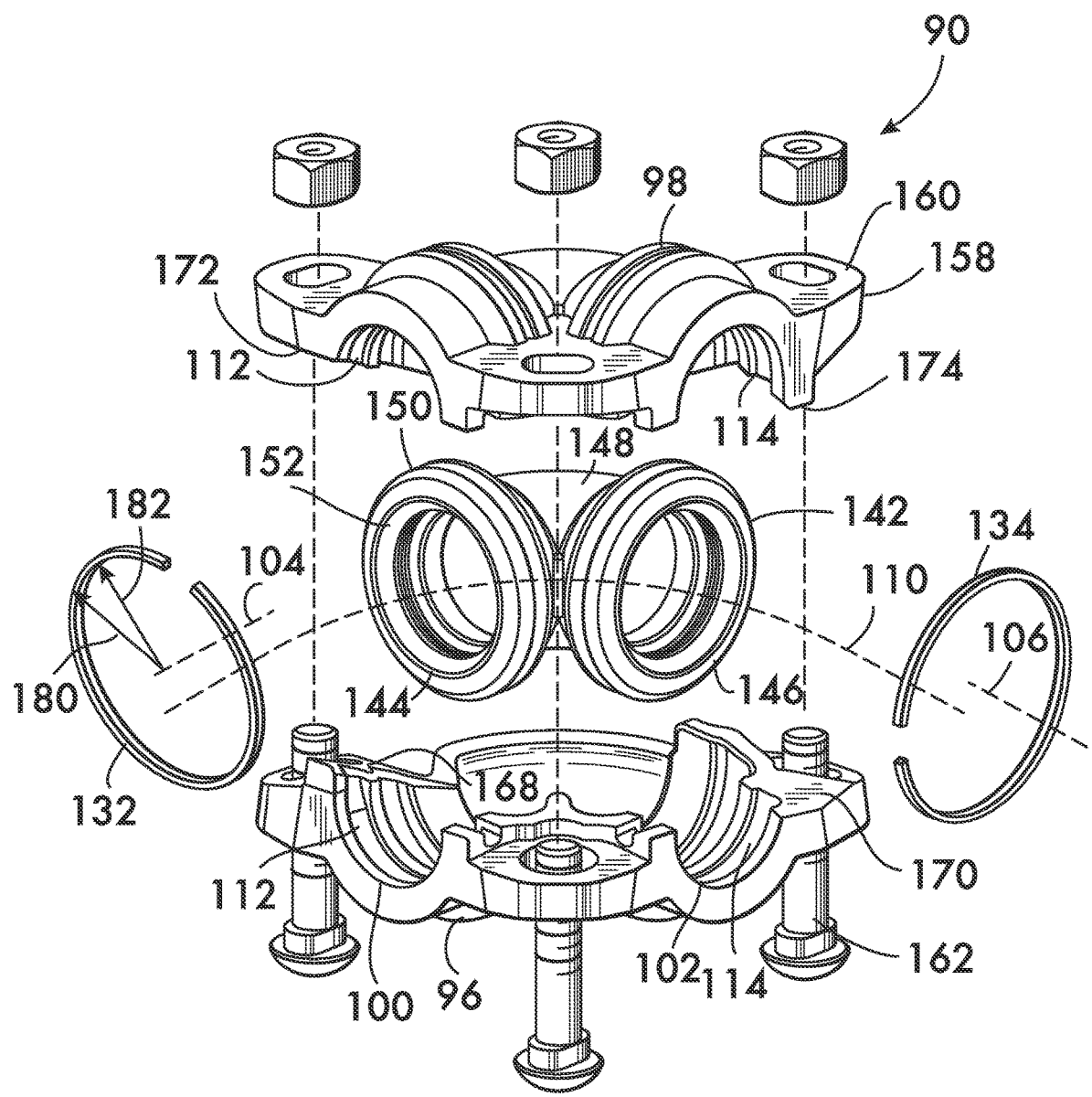
FIG. 13 is an exploded isometric view of the fitting shown in FIG. 12.

FIGS. 12 and 13 show an example embodiment of a fitting 90 for connecting pipe elements 92 and 94. Fitting 90 is shown as a 90° elbow fitting by way of example, but other elbow angles as well as "Tee" fittings joining three pipe elements are also contemplated. Fitting 90 comprises first and second housing portions 96 and 98 and is shown in FIG. 1 in a "preassembled state" where the housing portions are attached to one another in spaced apart relation. As explained below, it is advantageous to hold the housing portions 96 and 98 in spaced apart relation sufficient to allow pipe elements 92 and 94 to be inserted into the fitting. The housing portions 96, 98 are advantageously formed of metal, such as ductile iron.

Housing portions 96 and 98 define first and second receptacles 100 and 102 which receive respective pipe elements 92 and 94 upon insertion. First and second receptacles 100 and 102 surround respective first and second axes 104 and 106. First axis 104 is oriented coaxially with receptacle 100 and second axis 106 is oriented coaxially with receptacle 102. Axes 104 and 106 are angularly oriented with respect to one another. In this example the orientation angle 108 between axes 104 and 106 is 90°; other orientation angles are of course feasible. Housing portions 96 and 98 define a fluid path 110 between the receptacles 100 and 102.

Figure 14:
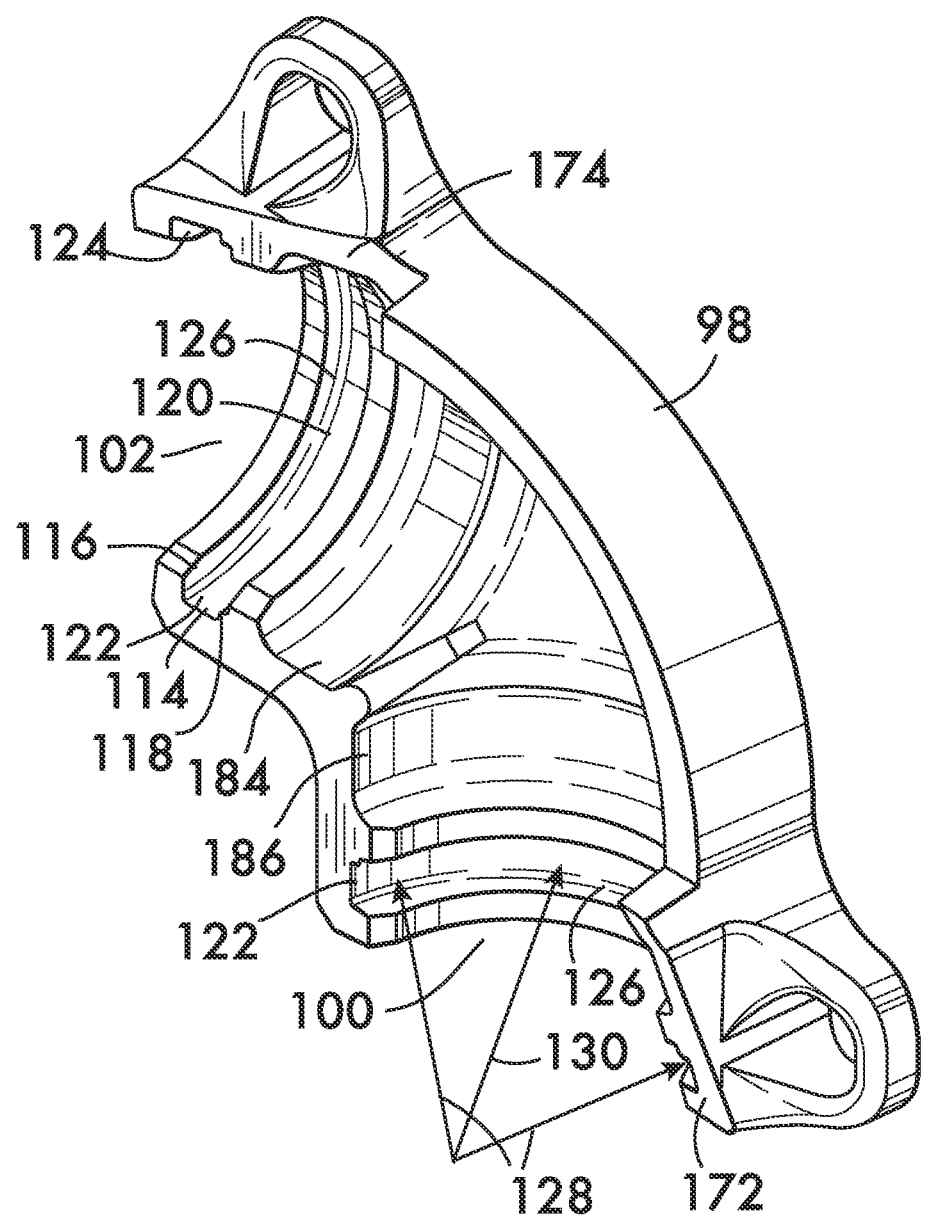
FIGS. 14 and 14A are an isometric views of example housing portions used with the fitting of FIG. 1.

As shown in FIGS. 13 and 14 the housing portions 96 and 98 each comprise a first groove 112 which extends circumferentially around the first receptacle 100 and a second groove 114 which extends around the second receptacle 102. As shown in FIG. 14, each groove 112, 114 is defined by two side surfaces 116, 118 arranged in spaced relation. A floor surface 120 extends between the side surfaces. Floor surface 120 comprises first and second surface portions 122 and 124 located at opposite ends of each groove 112, 114. A third surface portion 126 is positioned between the first and second surface portions 122 and 124 of each groove 112 and 114. One or both surface portions 122, 124 have a greater radius of curvature 128 than the radius of curvature 130 of the third surface portion 126. One or both surface portions 122, 124 may have a length that extends from about 5% to about 45% of the total length of a groove 112, 114 in one housing portion.

Figure 15:
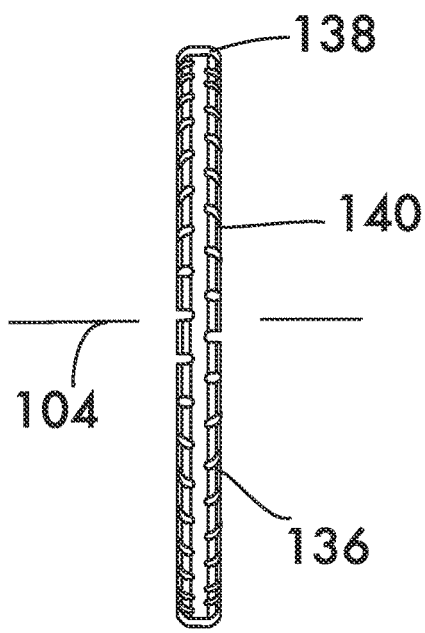
FIG. 15 is a side view of a toothed split ring.

As shown in FIGS. 12 and 13, a first split ring 132 is positioned within the first groove 112 surrounding receptacle 100 and a second split ring 134 is positioned within the second groove 114 surrounding the receptacle 102. Split rings 132 and 134 may have a rectangular cross sectional shape as shown and may be formed of spring steel, stainless steel, beryllium copper, as well as polymers including plastics such as nylon and acrylonitrile butadiene styrene (ABS). Split rings 132 and 134 are used to join grooved end pipe elements as described below. For joining plain end pipe elements a toothed split ring 136, shown in FIG. 15, is used. Toothed split ring 136 comprises a ring 138 having a plurality of teeth 140 arranged in spaced relation to one another. Teeth 140 extend circumferentially around the ring 138 and project toward axes 104 and 106 when the toothed split rings 136 are in respective grooves 112 and 114. The teeth are forced into engagement with the outer surface of the plain end pipe when the split rings 136 are deformed during formation of a joint. The teeth bite into the pipe elements to provide the desired mechanical engagement to secure them to the fitting 90. Use of either type of split ring (toothed or rectangular cross section) is expected to provide fittings 90 with exceptional stiffness.

Figure 16:
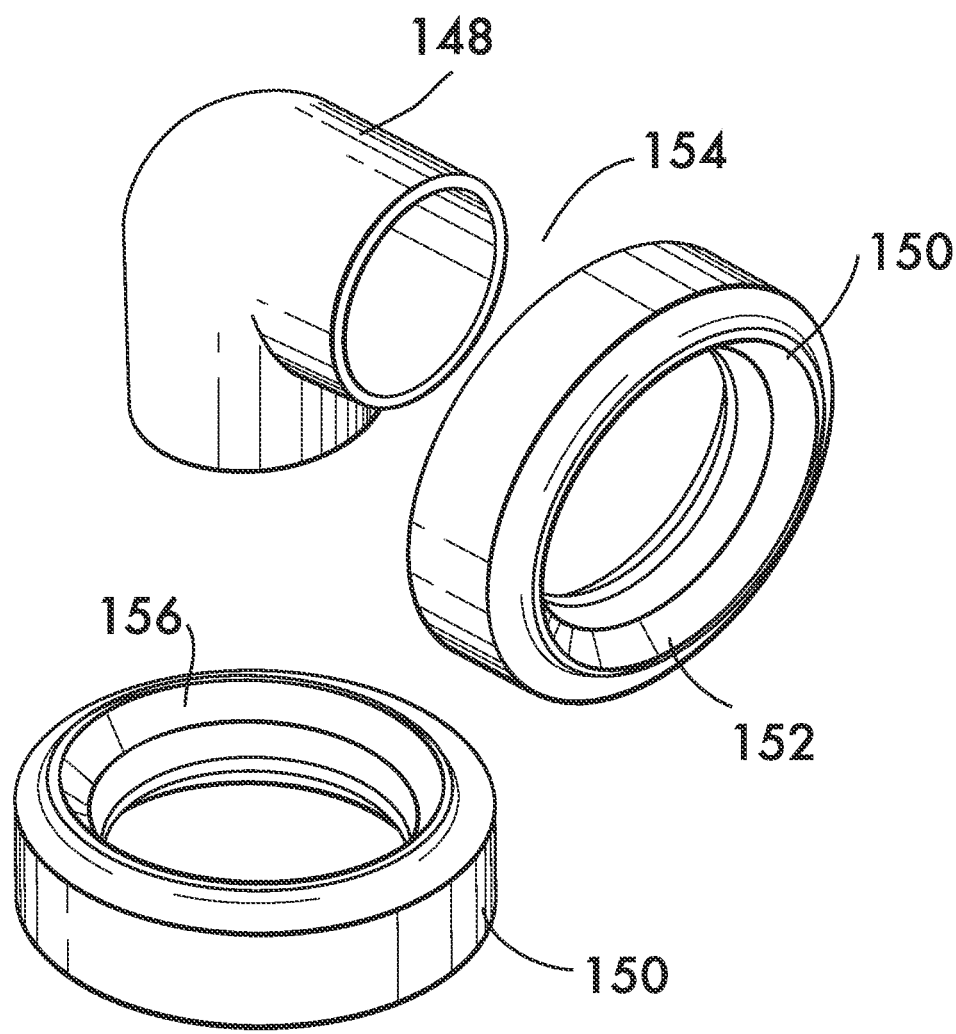
FIG. 16 is an exploded isometric view of a sealing element.

FIG. 13 also shows the sealing element 142 for fitting 90. Sealing element 142 comprises a first seal 144 positioned within the first receptacle 100, a second seal 146 positioned within the second receptacle 102, and a tube 148 which extends within the housing portions 96 and 98 along the fluid path 110 between the first and second seals 144 and 146. In the example embodiment shown in FIG. 13, each seal 144, 146 comprises a flexible, resilient ring 150 having a ring inner surface 152 adapted to engage the outer surfaces of pipe elements 92 and 94 (see FIG. 12). Ring inner surfaces 152 have a diameter sized to receive the pipe elements upon their insertion into receptacles 100 and 102 as described below. The ring inner surfaces 152 sealingly engage the pipe elements when the sealing element 142 is compressed between the housing portions 96 and 98. In example sealing element 142, rings 150 are integrally formed with the tube 148. Sealing element 142 may be formed from an elastomeric material. In another example sealing element 154, shown in FIG. 16, the rings 150 are formed separate from the tube 148. In this embodiment, rings 150 are formed of an elastomeric material and tube 148 may be formed from a harder, less resilient material against which ring sealing surfaces 156 may seal when the rings 150, 152 of sealing element 154 are compressed between the housing portions 96 and 98.

Figure 14A:
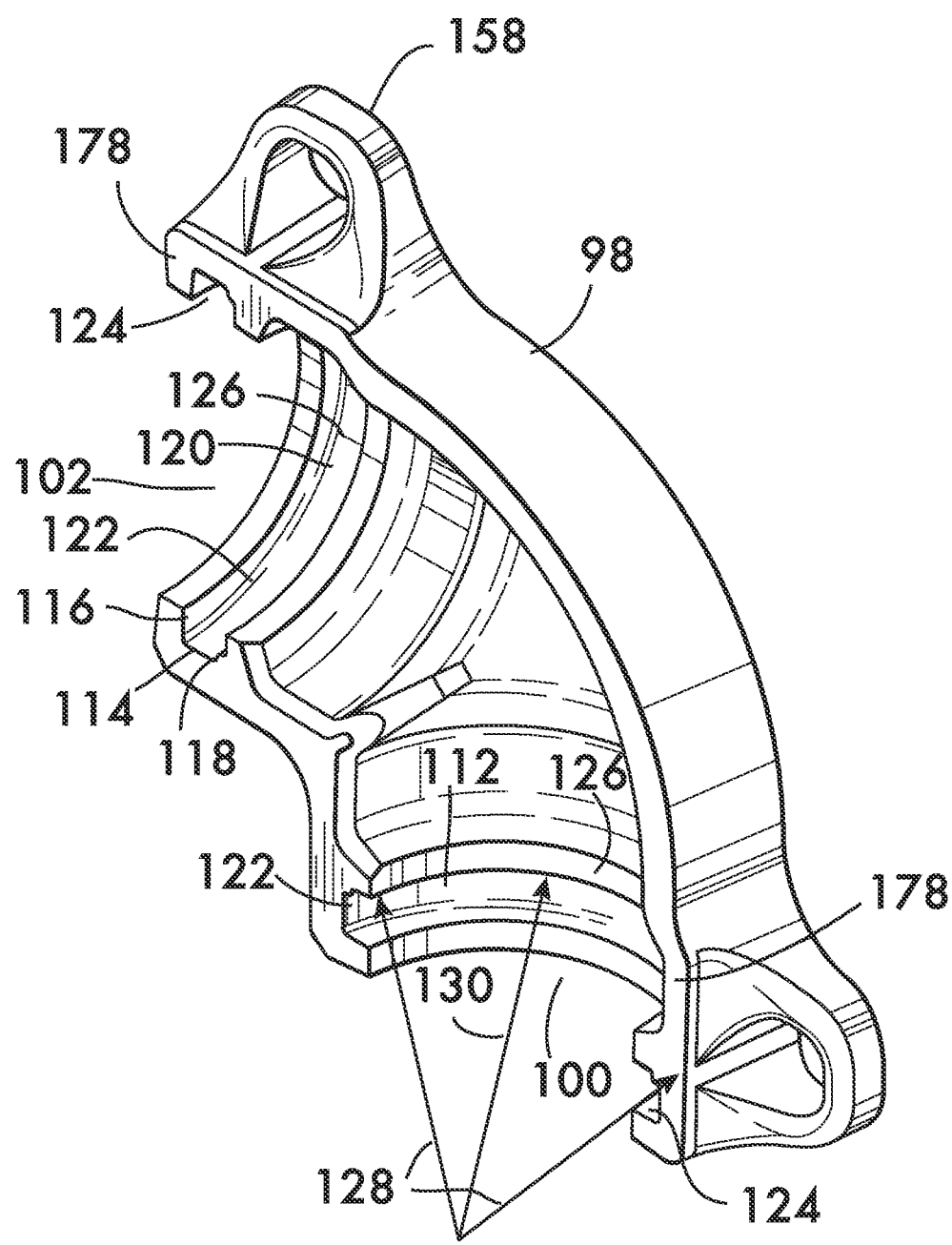
Figure 17:
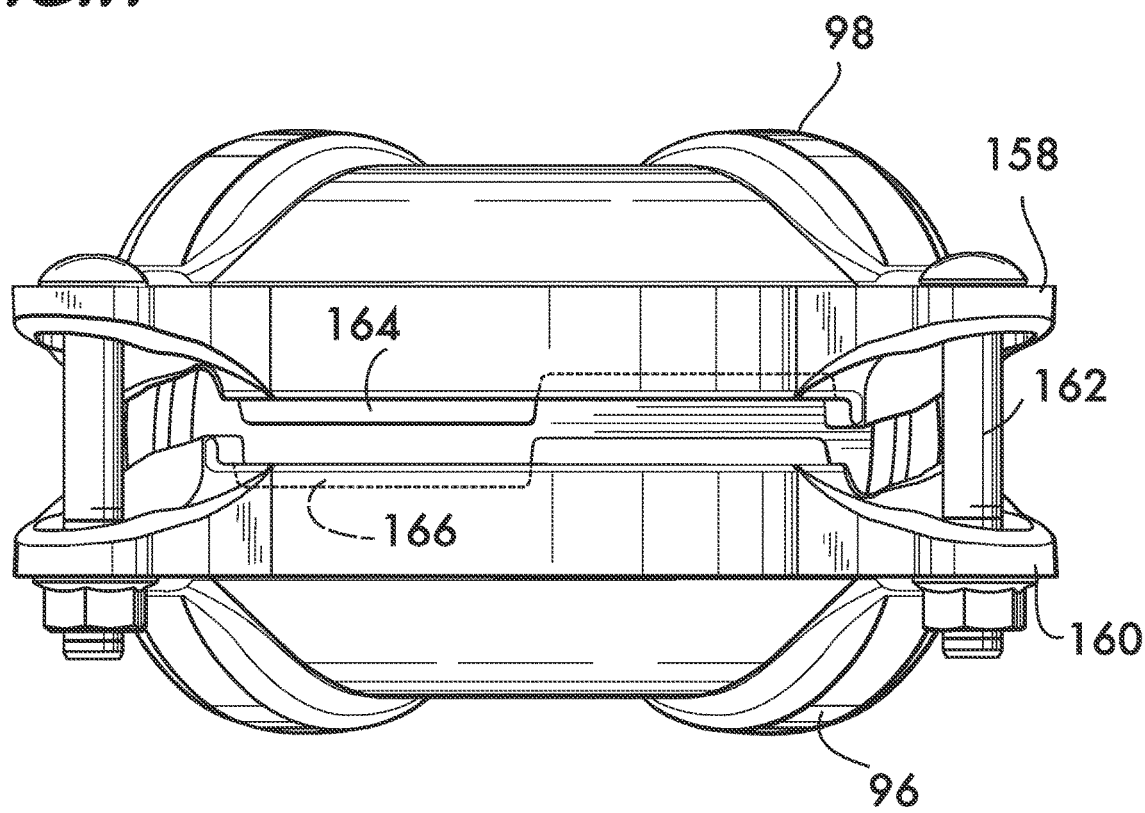
FIG. 17 is a rear view of the fitting shown in FIG. 12.
Figure 18:
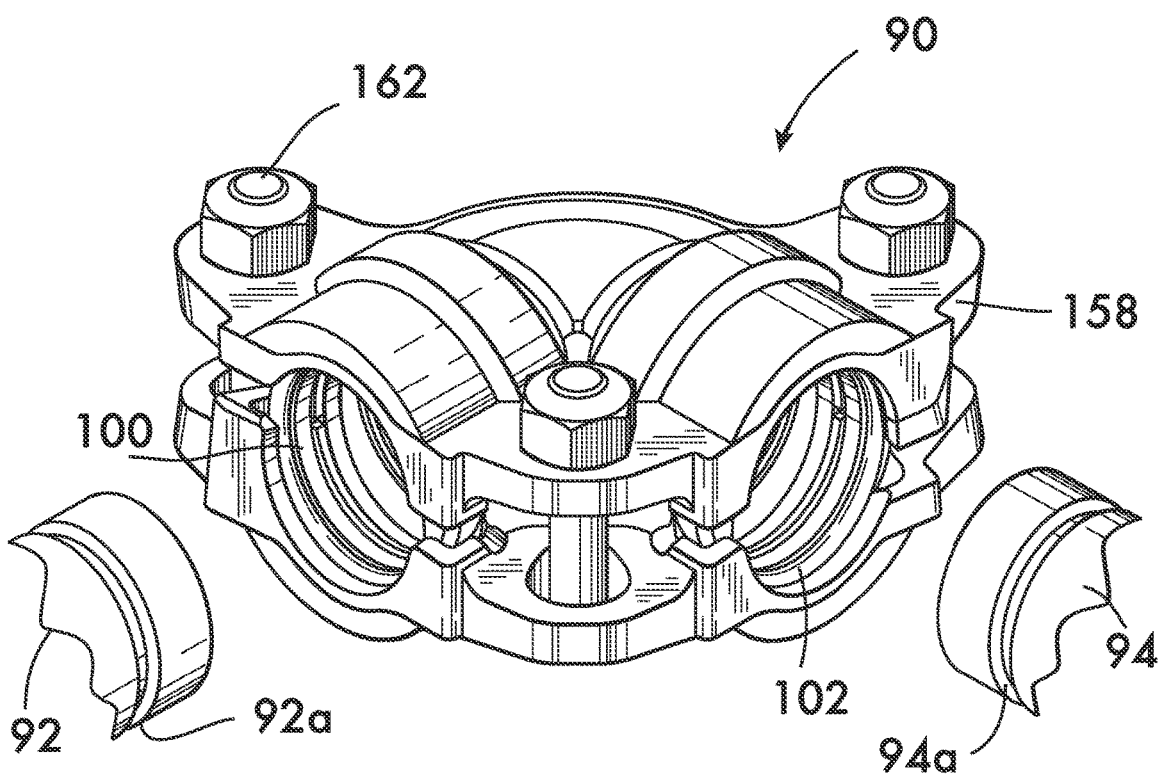
FIG. 18 is an isometric view of an example fitting forming a pipe joint.

As shown in FIGS. 12 and 13, each housing portion 96 and 98 comprises a plurality of adjustably tightenable connection members 158 (in this example, 3). In this example connection members 158 include lugs 160 on each housing portion which receive fasteners 162 that extend between the housing portions 96 and 98. Connection members 158 permit the housing portions 96 and 98 to be drawn toward one another when the fasteners 162 are tightened. As shown in FIG. 17, engagement between the housing portions 96 and 98 may be guided by projections 164 which extend from each housing portion and are received in recesses 166 in each housing portion. The stiffness of the joint formed between the pipe elements may also be determined by interfacing surfaces on each housing portion 96, 98. As shown in FIGS. 12, 13 and 14, housing portion 96 has angularly oriented surface portions 168 and 170 in facing relationship with respective mating angularly oriented surface portions 172 and 174 on housing portion 98. As the fasteners 162 are tightened the surfaces are brought into engagement. Because the slopes of the surfaces 168, 172 and 170, 174 are opposite to one another on opposite ends of the fitting 90 sliding motion between the surfaces is engendered which causes the housing portions 96, 98 to rotate in opposite directions relatively to one another about axis 176 (see FIG. 12) and force the split rings 132, 134 to engage the side surfaces of the grooves in which they are received, thereby adding rigidity to the joint. As shown in FIG. 14A, a more flexible joint is achieved if the interfacing surfaces 178 near the connection members 158 on the housing portions 96 and 98 (98 shown) are not angularly oriented.

As shown in FIG. 13, the split rings 132, 134 have an outer radius of curvature 180 and an inner radius of curvature 182. In their undeformed state, the outer radius of curvature 180 of the split rings is sized so that the split rings 132 and 134 engage the first and second surface portions 122 and 124 of floor surface 120 (see FIG. 14) and thereby cooperate with the seals to support the housing portions 96 and 98 in the preassembled state, in spaced apart relation sufficient to permit pipe elements to be inserted into the receptacles 100 and 102 as described in detail below. It is advantageous if the combined stiffness of one or both split rings 132 and 134 as well as the sealing element 142 or sealing element 145 is sufficient to maintain the housing portions 96 and 98 in this preassembled state during shipping, handling and assembly of the joint. It is further advantageous if the radii of curvature 128 of the first and second surface portions 132 and 134 of the floor surface 120 of the grooves 112 and 114 is substantially equal to the outer radii of curvature 180 of the split rings 132 and 134 in their undeformed state. Further to this end, when in their undeformed state, the inner radii of curvature 182 of the split rings 132 and 134 are sized to be at least as large as the maximum radius of the pipe elements that the fitting 90 is intended to join. This permits insertion of the pipe elements into the receptacles 100 and 102 when the fitting 90 is in its preassembled state.

The stiffness of the split rings 132 and 134, while sufficient to support the housing portions 96 and 98 in the spaced relation of the preassembled state, is not so great that it prevents the use of hand tools to tighten the fasteners 162 to draw the housing portions 96 and 98 toward one another, thereby deforming the split rings to the point where their outer radii 180 are smaller and substantially equal to the radius 130 of the third surface portion 126 of the grooves 112 and 114. The inner radii 182 also become smaller as the split rings deform to permit them to engage grooves in pipe elements and provide mechanical engagement between the fitting 90 and the pipe elements to retain the pipe elements to the fitting against externally applied forces as well as forces due to internal pressure within the pipe elements that would tend to cause separation of the joint. (Other types of pipe elements, for example, shouldered and shoulder and bead pipe elements may also be effectively engaged by the inner radii 182.)

Figure 19:
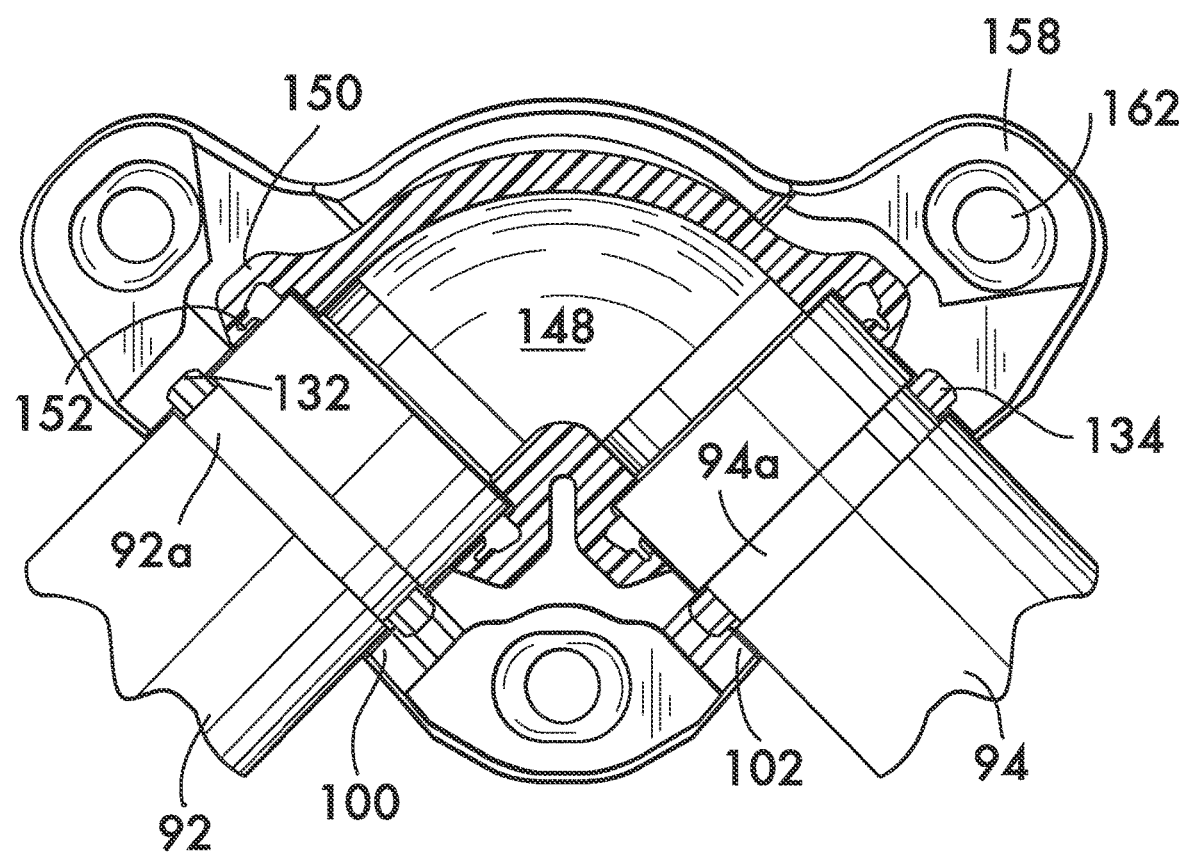
FIG. 19 is a plan sectional view of a fitting forming a pipe joint.
Figure 20:
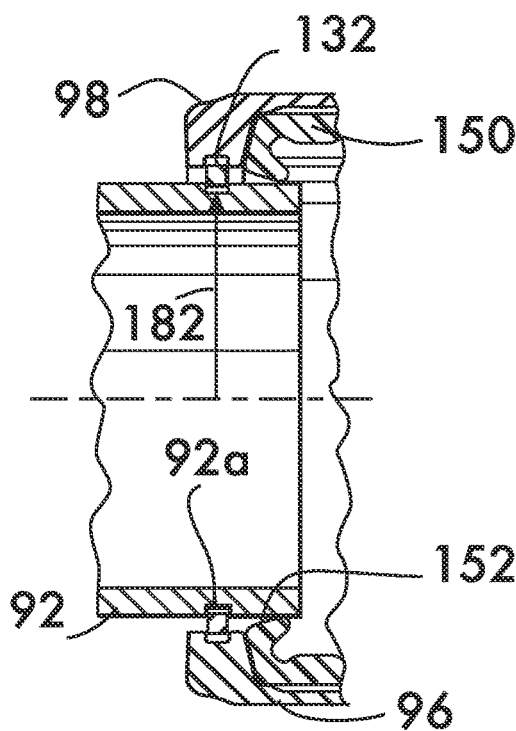
FIGS. 20 and 21 are longitudinal sectional views taken at lines 20-20 of FIG. 19.
Figure 21:
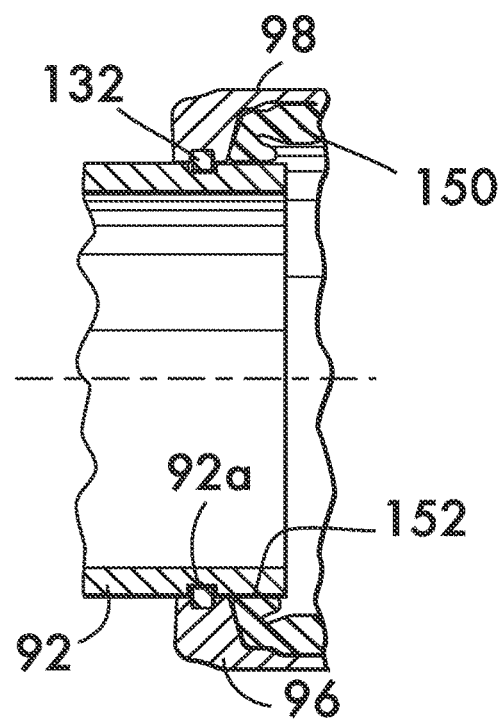
Figure 22:
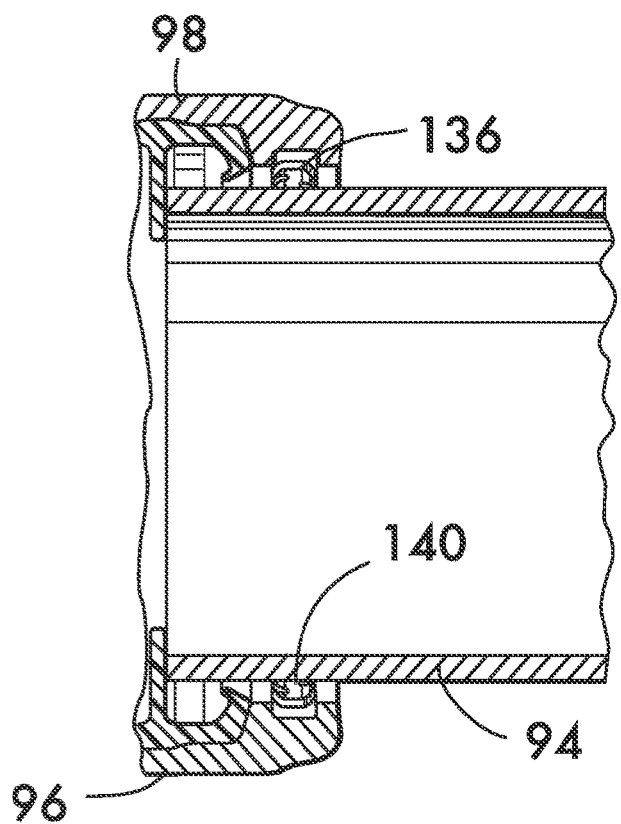
FIG. 22 is a longitudinal sectional view of a portion of an example fitting.

Assembly of a pipe joint is illustrated in FIGS. 18-21. With the fitting 90 in the preassembled state (FIG. 18) both pipe elements 92 and 94 are inserted into receptacles 100 and 102 (FIG. 19). The outer surfaces of the pipe elements 92 and 94 engage the ring inner surfaces 152 of rings 150 and contact an end of tube 148, which serves as a stop to locate the pipe elements within the receptacles. As shown in FIG. 19, respective circumferential grooves 92a and 94a on pipe elements 92 and 94 align with respective split rings 132, 134 in grooves 112 and 114. The split rings are in their undeformed shape, thus, as shown in FIG. 20, the inner radii 182 of the spilt rings 132, 134 are at least equal to or greater than the outer radii of the pipe elements 92 and 94 (only 92 shown) thereby enabling the pipe elements to pass through the split rings upon insertion. Fasteners 162 of the connection members 158 (see FIG. 18) are tightened. Adjustable tightening of the connection members 158 draws housing portions 96 and 98 toward one another thereby compressing the split rings 132 and 132. As shown in FIG. 21, the split rings deform such that they engage the outer surfaces of the pipe elements 92 and 94 (92 shown) within grooves 92a and 94a. For plain end pipe (see FIGS. 15 and 22), compression of the toothed split rings 136 causes their teeth 140 to bite into the outer surface of the pipe elements (94 shown).

Deformation of the split rings 132, 134 and 136 is preferably substantially elastic, allowing them to spring back substantially to their original shape when the fasteners 162 are loosened, thereby permitting the fitting 90 to be reused in the manner according to the invention as described herein. The split rings may also be designed to have significant plastic deformation, wherein the deformation imparts a permanent set to the rings. For practical fittings, there will generally be some degree of both plastic and elastic deformation occurring in the split rings as a result of tightening the fasteners. The sealing element 142 is also deformed by this process, with the ring inner surfaces 152 coming into full engagement with the pipe element outer surfaces (see FIG. 20).

Figure 23:
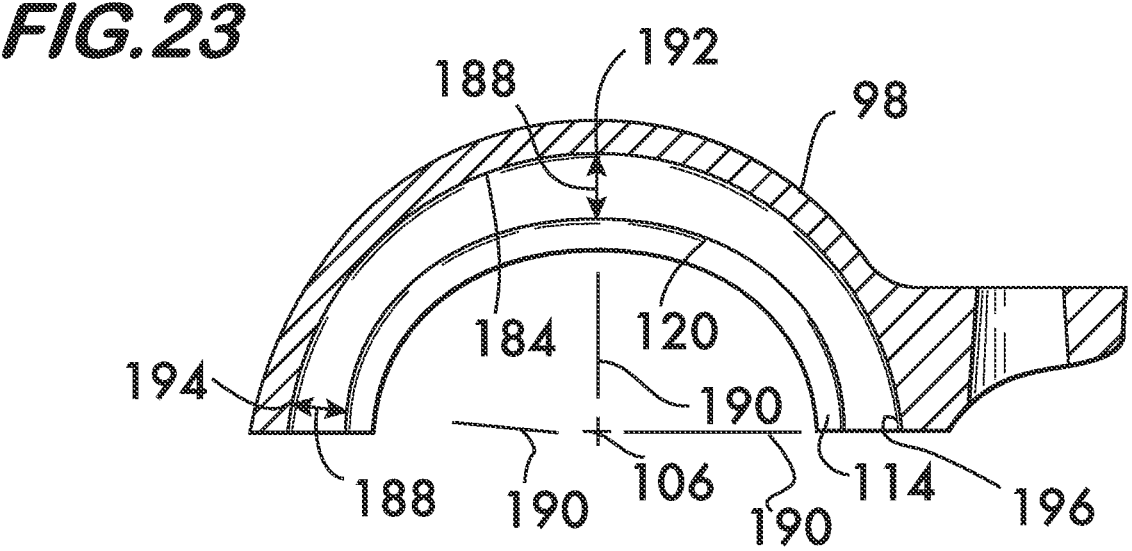
FIGS. 23-25 are cross sectional views of example embodiments of fittings.
Figure 24:
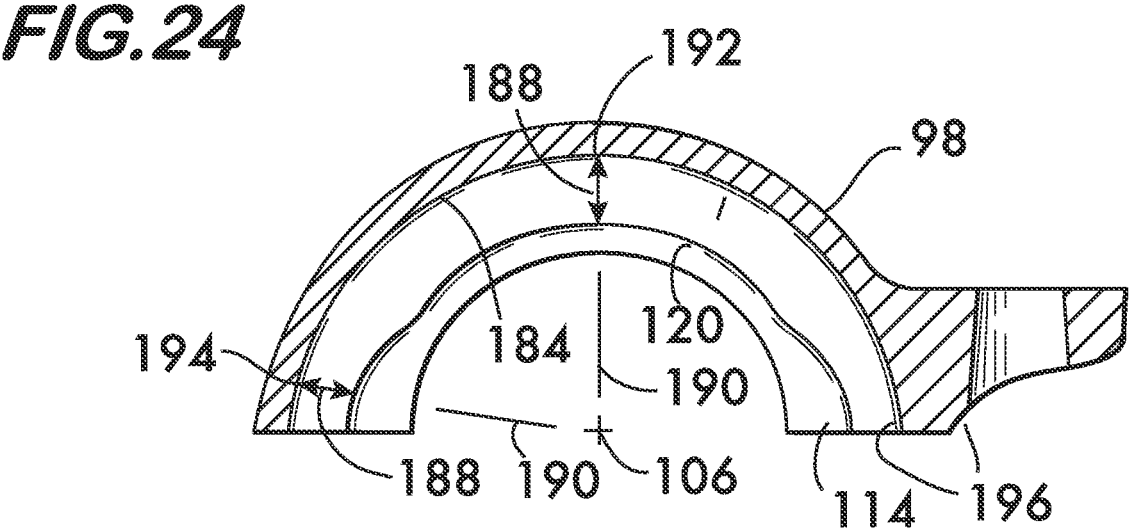
Figure 25:
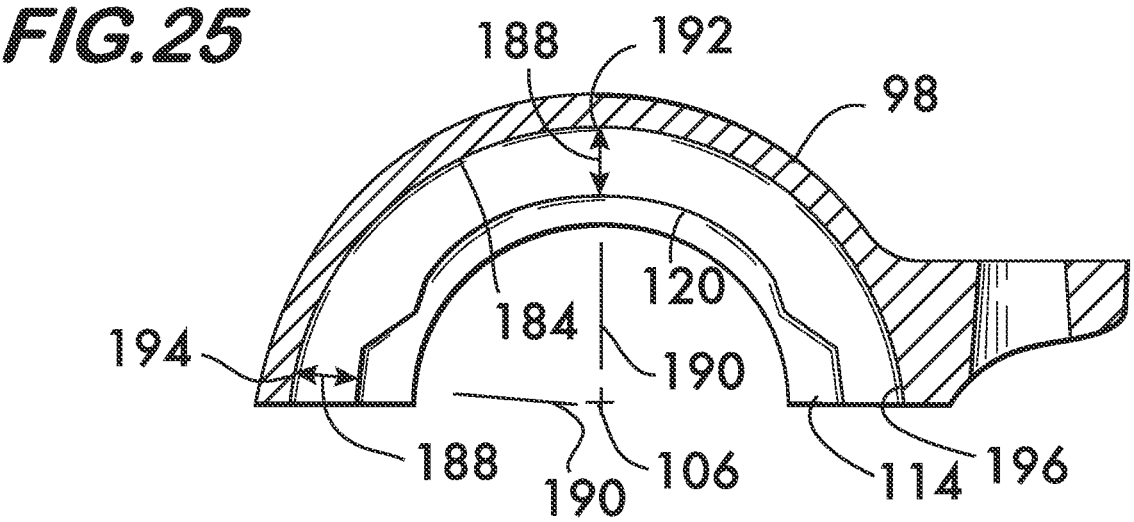

As shown in FIGS. 23-25, housing portions 96 and 98 (98 shown) may also be described by the geometric relation between back walls 184, 186 (see also FIG. 14) respectively surrounding axes 104 and 106, and the floor surfaces 120 of the grooves 112, 114 that receives the split rings (not shown). The geometric relation which permits the split rings to support the housing portions 96 and 98 in spaced relation as described above relates to a distance 188, measured between the surface of back walls 184, 186 and the floor surface 120 of grooves 112, 114. The geometric relation is described below for one back wall 186 and one floor surface 120 of groove 114 on one housing portion 98, it being understood that the relation may also apply to both receptacles 100, 102 on both housing portions 96 and 98.

As shown in FIG. 23, distance 188 is measured along a radially projecting line 190 extending from axis 106. Distance 188 is a first value at a first point 192 midway between opposite ends of the groove 114, and a second value at a second point 194 proximate to one end of the groove 114. The first value is greater than the second value. Distance 188 may also be measured along line 190 at a third point 196 proximate to the other end of groove 114. It is advantageous for distance 188 at the third point 196 to have a third value equal to the second value to symmetrically support the housing portions 96 and 98 in spaced apart relation on the split rings 132, 134.

This geometric condition between floor surfaces 120 and back walls 184, 186 may be accomplished, for example as shown in FIG. 23 by continuously changing the curvature of the floor 120 as it traverses between the points 194, 192 and 196. In another example, shown in FIG. 24, the curvature of floor 120 is changed abruptly in the regions proximate to the ends of groove 114. FIG. 25 shows floor 120 formed of faceted, straight segments in the regions proximate to the ends of the groove 114 to receive the split rings for support of the housing portions in spaced relation.

Figure 26:
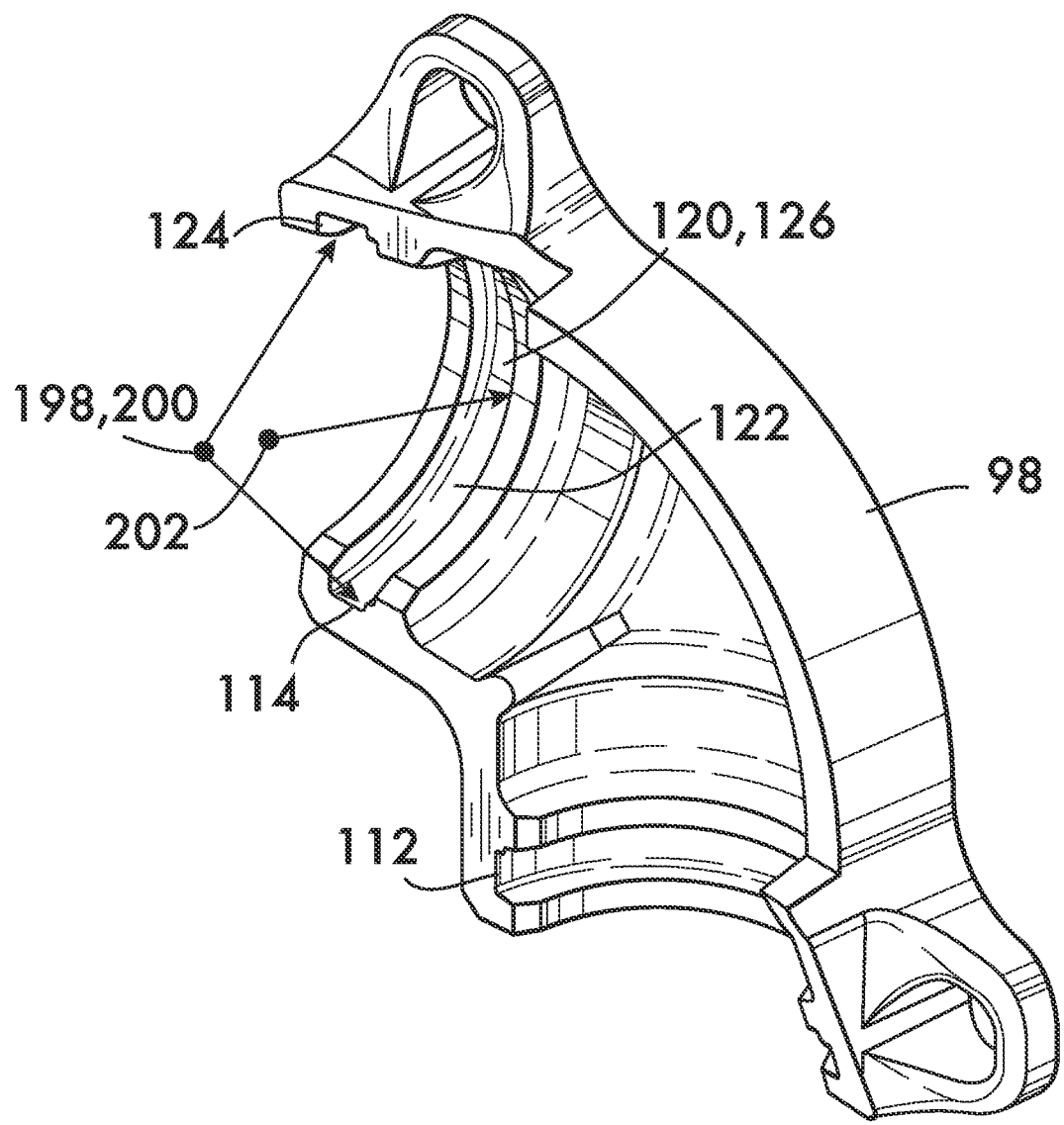
FIG. 26 is an isometric view of a housing portion of an example fitting.

Yet another way of describing the geometry of the floor surfaces 120 so that the split rings 132, 134 support the housing portions 96 and 98 is illustrated in FIG. 26. As described above, floor surfaces 120 each comprise three surface portions 122, 124 and 126. The first and second surface portions 122 and 124 are arranged, respectively, at opposite ends of the grooves 112 and 114. The third surface portion 126 is positioned between the first and second surface portions 122 and 124. Each of the first and second surface portions 122 and 124 has a respective center of curvature 198 and 200, and these centers of curvature are offset from (i.e., not coincident with) the center of curvature 202 of the third surface portion 126. As shown in FIG. 26, the centers of curvature 198 and 200 of the first and second surface portions 122 and 124 can be coincident which results in symmetric support of the housing portions 96 and 98 by the split rings 132, 134.

Fittings 90 according to the invention are expected to provide improved performance, for example, withstand higher internal pressures and external forces while also reducing the time and effort required to form a joint because the fittings are provided in the preassembled state.

What is claimed is:

1. A coupling for joining pipe elements in end to end relation, said coupling comprising:
   a plurality of segments attached to one another end to end in a preassembled state, in spaced apart relation and surrounding a central axis and defining a central space prior to receiving said pipe elements;
   each of said segments having a channel defined by a back wall extending between said ends, each of said back walls having a surface facing said central axis;
   each of said segments having at least one groove extending between said ends of said segments, said at least one groove being positioned adjacent to said channel, said at least one groove defined by two side surfaces arranged in spaced relation and a floor surface extending therebetween, said floor surface facing said central axis;

a split ring positioned within said at least one groove; wherein, for at least said one segment:

a distance between said surface of said back wall and said floor surface, as measured radially from said central axis, being a first value at a first point midway between said ends of said at least one segment, and a second value at a second point proximate to at least one of said ends of said at least one segment, said first value being greater than said second value.

2. The coupling according to claim 1, wherein said split ring engages said floor surface in at least one of said grooves proximate to said ends of at least one of said segments, said split ring supporting said segments in said spaced apart relation.

3. The coupling according to claim 2, wherein said split ring has an outer radius of curvature and an inner radius of curvature, said inner radius of curvature being at least equal to an outer radius of said pipe elements.

4. The coupling according to claim 3, wherein said floor surfaces comprise respective first and second surface portions arranged respectively at opposite ends of said segments, each said floor surface having a respective radius of curvature, said respective radii of curvature of said first and second surface portions being substantially equal to said outer radius of curvature of said split ring.

5. The coupling according to claim 1, wherein said split ring supports said segments in said preassembled state in spaced apart relation sufficient to allow said pipe elements to be inserted into said central space.

6. The coupling according to claim 4, wherein at least one of said first and second surface portions has a length extending from about 5% to about 30% of a total length of at least one of said grooves.

7. The coupling according to claim 1, further comprising a seal positioned within said channels of said segments.

8. The coupling according to claim 1, wherein said segments comprise adjustably tightenable connection members for drawing said segments toward said central space.

\* \* \* \* \*